| ODD | EVEN | | R | A | B | C | D | E | F | |
|---|---|---|---|---|---|---|---|---|---|---|
| | | | | Y(9/8) L(11/3) S(9/2) X(9/7) A(12/1) N(11/5) | P(11/7) I(12/9) R(11/9) U(9/4) B(12/2) O(11/6) | | | | | | CARDS AS ORIGINALLY PLACED IN MACHINE |
| R(11/9) I(12/9) P(11/7) N(11/5) A(12/1) X(9/7) L(11/3) | O(11/6) B(12/2) U(9/4) S(9/2) Y(9/8) | | | | | | | | | POSITION OF CARDS AFTER FIRST SORTING OPERATION |
| | | | | I(12/9) R(11/9) Y(9/8) | X(9/7) P(11/7) O(11/6) | N(11/5) U(9/4) | L(11/3) S(9/2) B(12/2) | A(12/1) | | | POSITION OF CARDS AFTER SECOND SORTING OPERATION |
| L(11/3) N(11/5) O(11/6) P(11/7) R(11/9) | A(12/1) B(12/2) S(9/2) U(9/4) X(9/7) Y(9/8) I(12/9) | | | | | | | | | POSITION OF CARDS AFTER THIRD SORTING OPERATION |
| | | | | | | | | Y(9/8) X(9/7) U(9/4) S(9/2) | R(11/9) P(11/7) O(11/6) N(11/5) L(11/3) I(12/9) B(12/2) A(12/1) | POSITION OF CARDS AFTER FOURTH SORTING OPERATION |

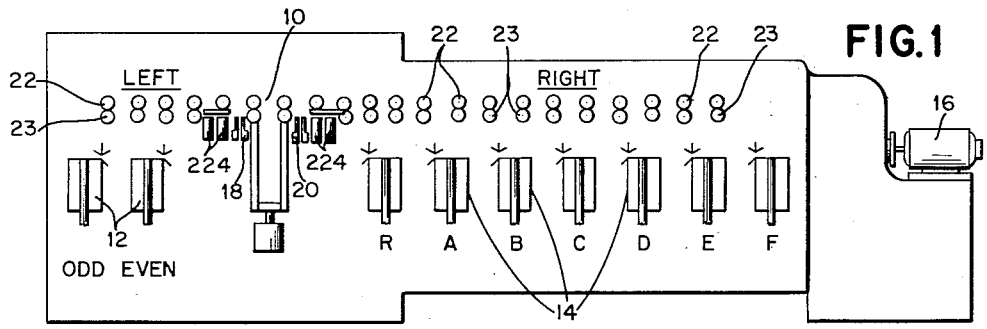

FIG.1B

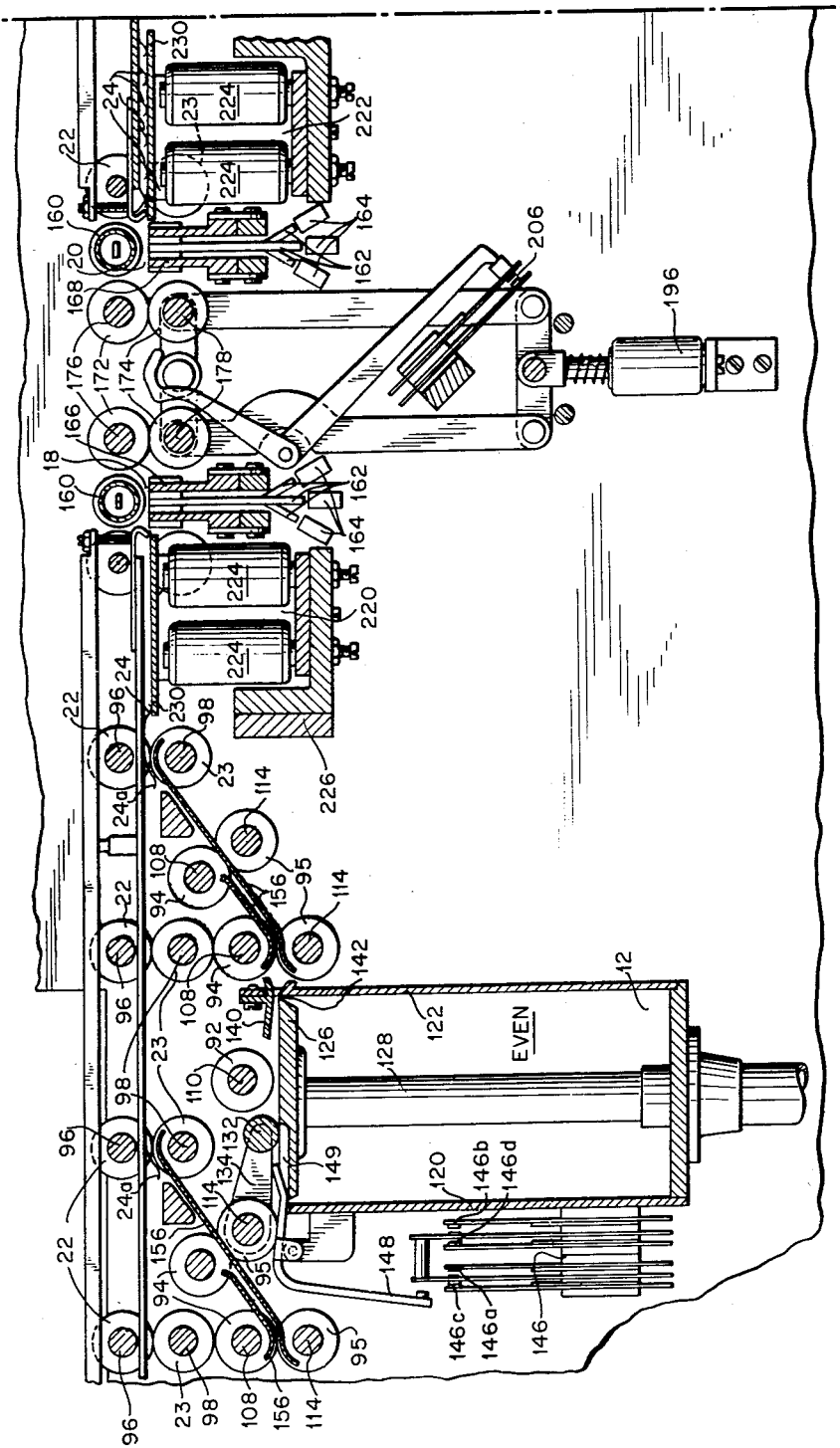

July 25, 1961

A. H. DICKINSON ET AL 2,993,595

AUTOMATIC SORTING MACHINE

Filed April 4, 1956

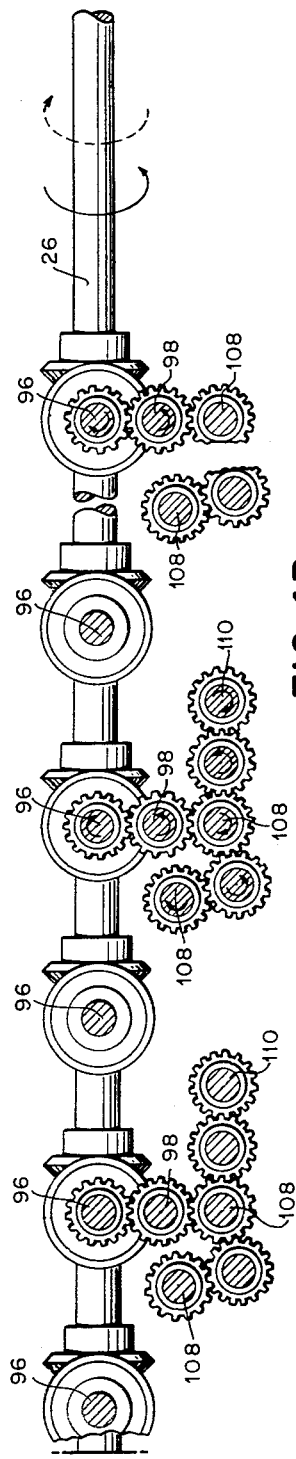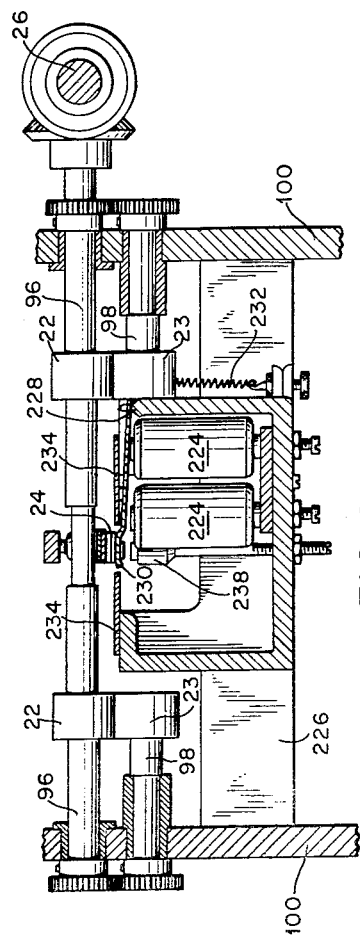

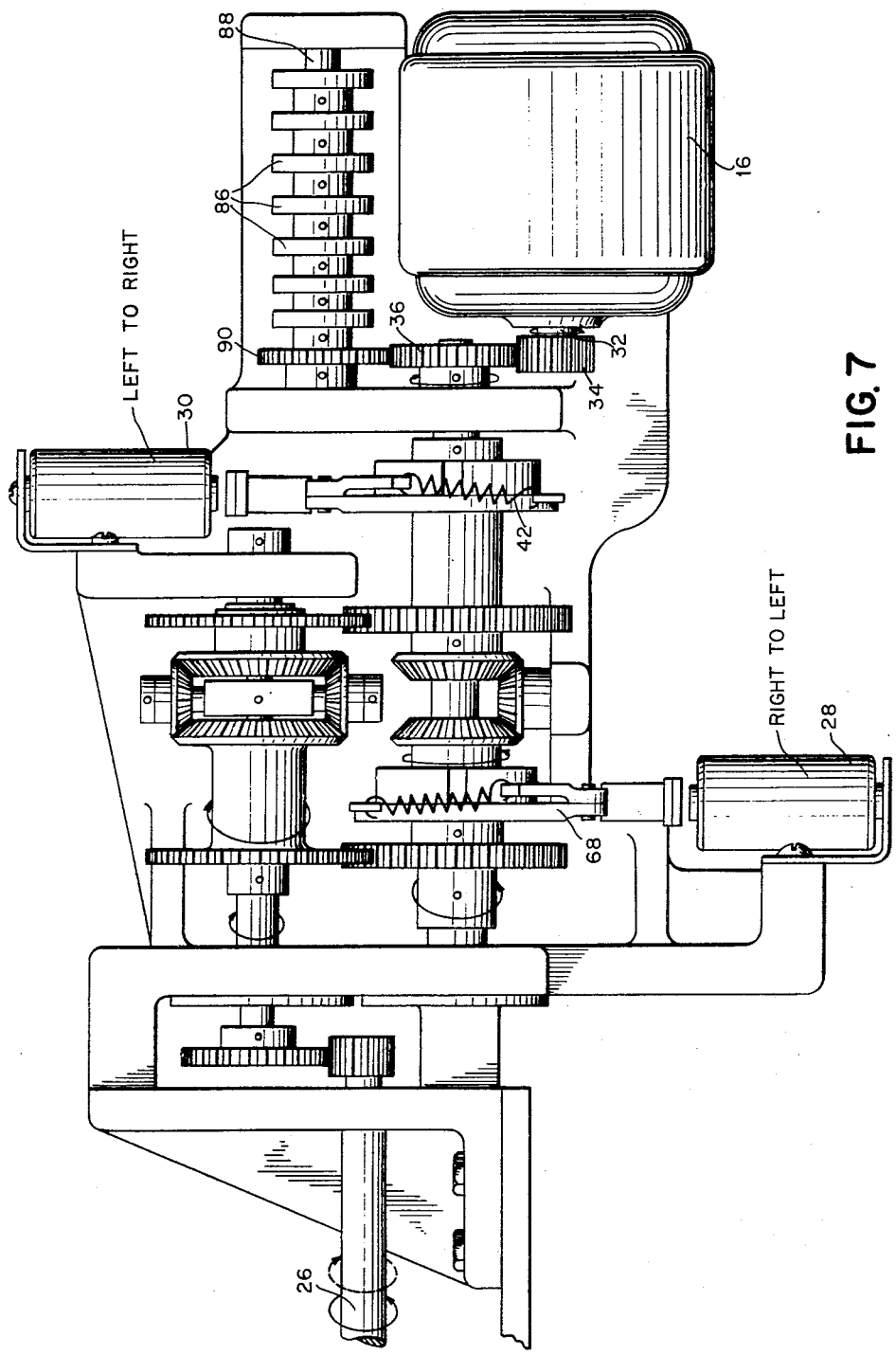

July 25, 1961

A. H. DICKINSON ET AL 2,993,595

AUTOMATIC SORTING MACHINE

Filed April 4, 1956

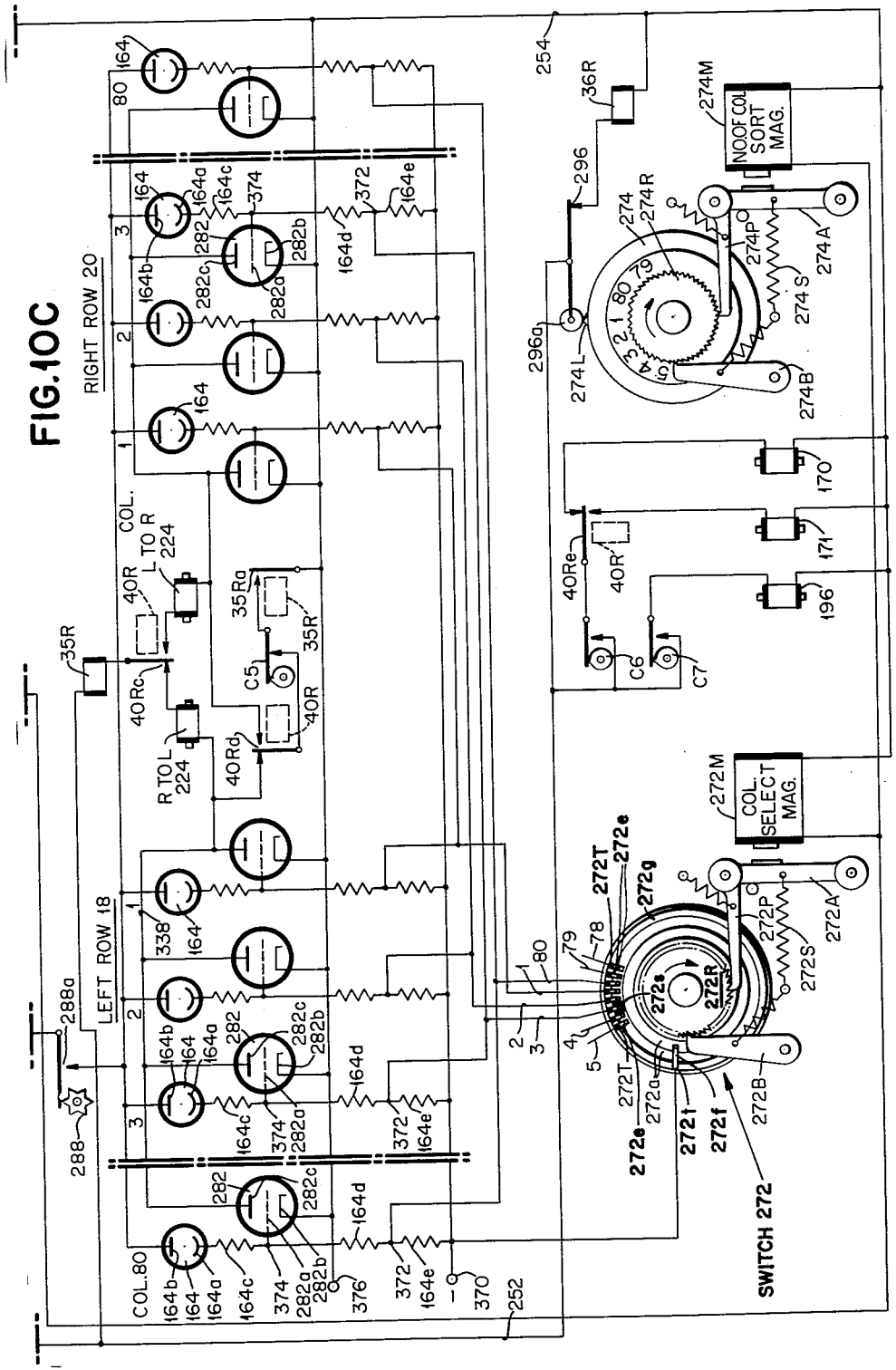

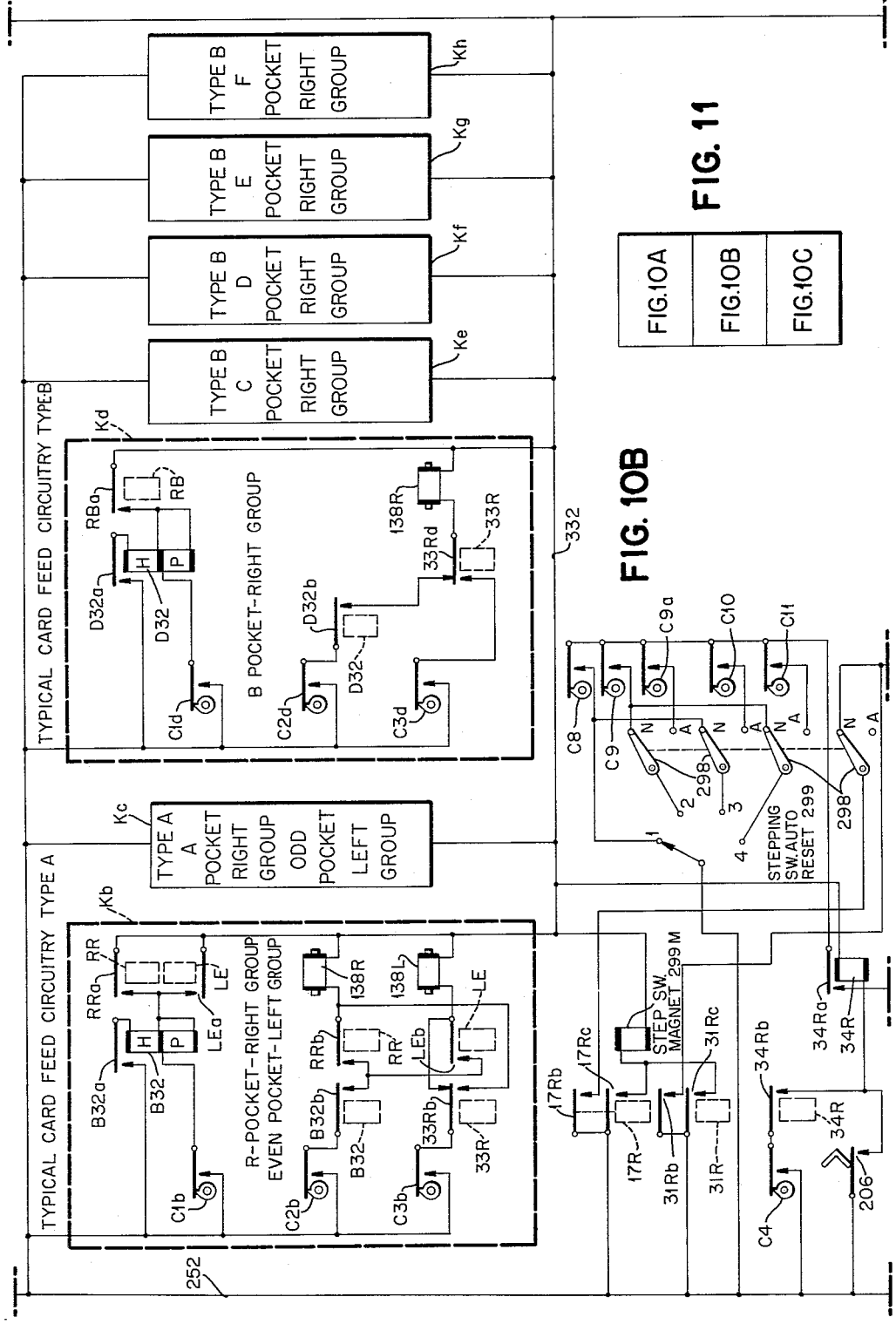

2,993,595
Patented July 25, 1961

2,993,595
AUTOMATIC SORTING MACHINE
Arthur H. Dickinson, Greenwich, Conn., and Herbert J. Hallstead, Flushing, N.Y., assignors to International Business Machines Corporation, New York, N.Y., a corporation of New York
Filed Apr. 4, 1956, Ser. No. 575,995
4 Claims. (Cl. 209—111.5)

The present invention relates to record sorting and more particularly to an improved fully automatic machine operated in accordance with a novel principle of sorting to arrange groups of cards bearing single or mulit-order identifying data in sequential order.

The preferred embodiment of the subject invention, herein disclosed, is in the form of an automatic sorting machine of the type disclosed in the copending application bearing Serial No. 556,502, filed December 30, 1955, in behalf of Arthur H. Dickinson and assigned to the assignee of the present invention. The sorting machine disclosed in the above mentioned copending application includes a sensing station located between a first and a second group of card pockets. The machine is provided with reversible drive and feeding mechanism, and sorting is accomplished by first feeding cards from the first group of pockets through the sensing station to pockets in the other group, and then back from the second group of pockets through the sensing station to the pockets in the first group. The machine of the copending application has thirteen pockets in each group of pockets and associated with each group of pockets are 12 sorting blades. The blades associated with each group of pockets are selectively actuable under control of sensing means at the sensing station to direct the cards fed from the other group of pockets into pockets in the associated group according to the data sensed. The records utilized with this machine are of the "IBM" type, on which indicia is recorded in the decimal notation. Each of the groups of pockets include a pocket corresponding to each digit in the decimal notation, and each operation from one group of pockets to the other is sufficient to effect numeric sorting on one decimal order of the field being sorted. The machine of the copending application is designed for use in record card installations wherein speed of sorting is a prime requirement, and the high speeds attainable by that machine are sufficient to warrant the expense entailed in the manufacture of a rather large machine having 26 pockets.

An object of the present invention is to provide a relatively inexpensive fully automatic sorting machine.

This object is accomplished according to the principles of the invention, as demonstrated by the embodiment herein disclosed, by effecting the sequential arrangement of record cards according to a novel method of sorting. The novel method is herein disclosed with reference to a machine adapted to sequentially arrange cards of the well-known "IBM" type, in which cards, as has been previously mentioned, recordings are made in the form of digital values in the decimal notation. According to this novel method, two sorting operations are required to arrange a group of cards into sequential order according to a single order of decimal information. In the first operation, the cards to be sorted are arranged, face down, in two groups, the cards having an odd digit in the order being sorted being placed in one group and the cards having an even digit being placed in the other group. In the second operation the cards are arranged in five different groups. The cards in either the odd or even group, according to whether the desired sequence is ascending or descending, are first sorted into these five groups. Where, for example, an ascending sequence is desired, the records bearing an even digit in a particular order are first placed in these five groups, the cards bearing the digit zero being placed, face down, in the first group, those bearing the digit two in the second group, those bearing the digit four in the third group, those bearing the digit six in the fourth group, and those bearing the digit eight in the fifth group. The records identified by an odd digit are then placed, face down, on top of the even cards in these five groups, the cards bearing the digit one being placed on top of the "zero" cards in the first group, the cards bearing the digit three being placed on top of the "two" cards in the second group, etc. These operations are illustrated in the table below for 15 cards each of which bears decimal information and is identified by two of the digits which it bears.

FIRST OPERATION

| Odd | Even |
|---|---|
| 23 | 48 |
| 45 | 30 |
| 69 | 24 |
| 77 | 22 |
| 81 | 86 |
| 67 | 78 |
| 73 | 20 |
| 65 | |

SECOND OPERATION

| Group 1 | Group 2 | Group 3 | Group 4 | Group 5 |
|---|---|---|---|---|
| 81 | 73 | 65 | 67 | 69 |
| 20 | 23 | 45 | 77 | 78 |
| 30 | 22 | 24 | 86 | 48 |

After the second operation the cards may be placed in a single group in ascending sequence according to the digits in the units order by placing the cards in the second group on top of those in the first group, those in the third group on the top of those in the second group, etc. Where it is desired to arrange the cards in descending sequence it is necessary during the second operation to first place the odd cards in the five groups and then the even cards on top of the odd cards. Where the cards are placed face up instead of face down, the procedure on the second operation is, in each case, reversed.

The preferred embodiment, herein disclosed as illustrating the principles of the invention, includes a sensing station having on one side a first group of card pockets, six in number, and on its other side a second group of pockets, two in number. The pockets in each group are designed so that cards may be either fed from the pockets or stacked in them. Cards, to be sorted, are placed in random fashion, face down, in pockets of the first group and the feeding mechanism actuated to feed these cards individually from these pockets through the sensing station and into one or the other of the pockets in the second group according to whether the digit sensed is odd or even. After all of the cards have been stacked in one or the other of the pockets in the second group, the feeding mechanism is reversed and the cards in the even pocket in the second group are fed through the sensing station and into pockets in the first group; the cards having a zero in the column sensed being directed into the first pocket, the cards having a two in the column sensed being directed into the second pocket, etc. After all the cards in the even pocket have been fed, the cards in the odd pocket are fed through the sensing station and into the pockets in the first group; the cards bearing a one in the column sensed being directed into the first pocket, those bearing a two in the column sensed being directed into the second pocket, etc. Thus, for each order of information in the field being sorted, two operation are necessary, however, the complete sorting operation is fully automatic and is accomplished by a relatively small machine requiring only seven pockets for numeric sorting. Where the data being sorted on is alphabetic and recorded in the well-known "IBM" combinational form of zone and numeric information, four sorting operations are required to sequentially arrange the informational items according to one order of the sort field. The first two operations are the same as for a numeric sort in that the items are arranged according to the numeric portion of the alphabetic data, and during the last two operations the items are arranged sequentially according to the zone information.

Thus, another object of the invention is to provide a novel method of arranging a plurality of informational items in an order with respect to the items themselves or with respect to data recorded therewith.

Another object is to provide a machine designed to operate in accordance with this novel method of sorting.

A feature of the invention lies in the provision of a machine, operated in accordance with this novel method, which requires a plurality of sorting operations to sort with respect to a single order of identifying data and in which the informational items identified by this data are arranged during each operation in a plurality of groups less in number than the number of digits in the notation in which the identifying data is recorded.

Other objects of the invention will be pointed out in the following description and claims and illustrated in the accompanying drawings, which disclose, by way of example, the principle of the invention and the best mode, which has been contemplated, of applying that principle.

In the drawings:

FIG. 1 is a side view, partly schematic, of a machine embodying the invention.

FIGS. 1A and 1B are schematic diagrams illustrating the operation of the machine during particular sorting applications.

Figure 2B:
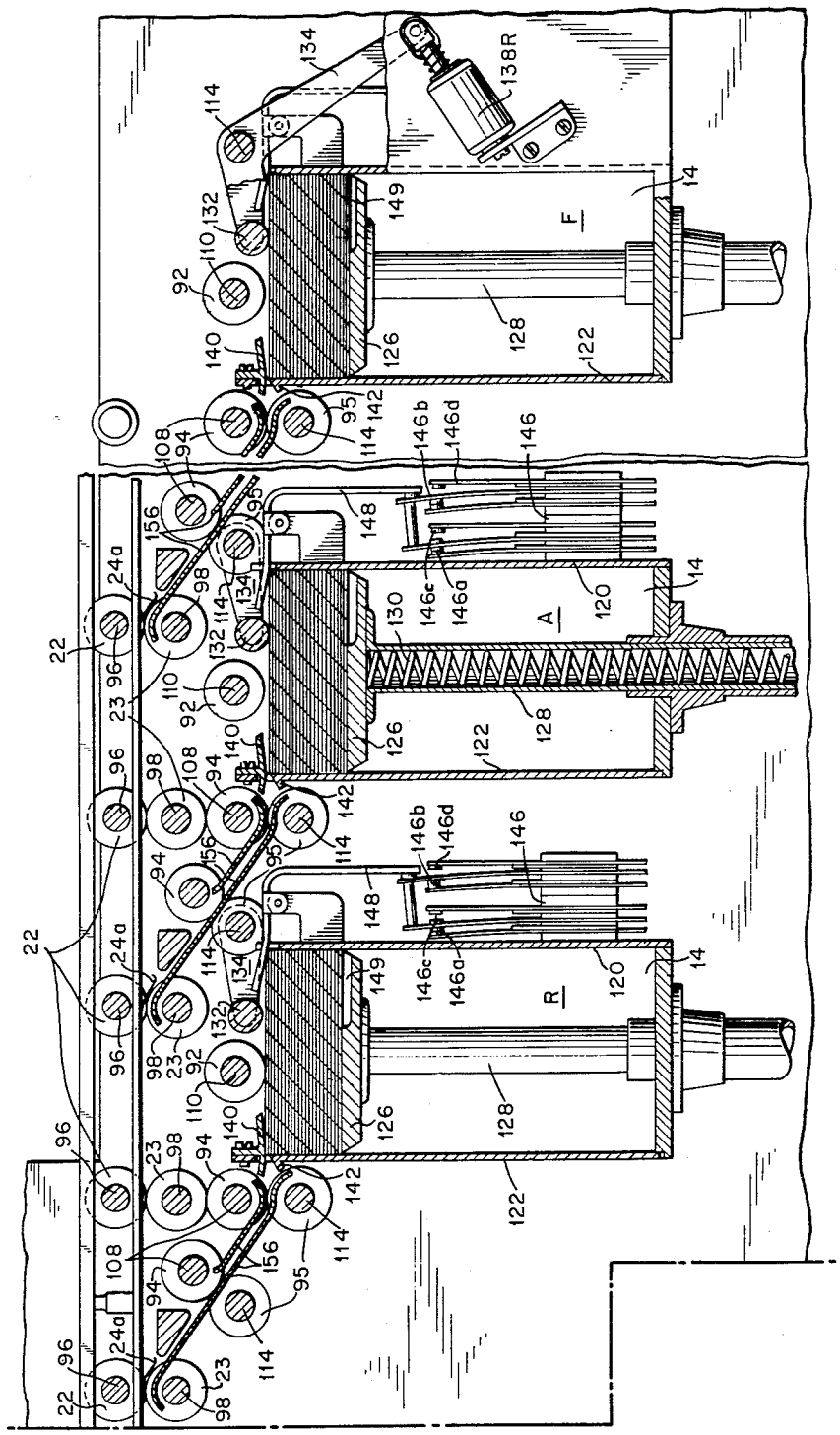

FIGS. 2A and 2B taken together constitute a sectional elevation taken through the center of the machine and show in detail certain of the card pockets of the machine.

Figure 3A:
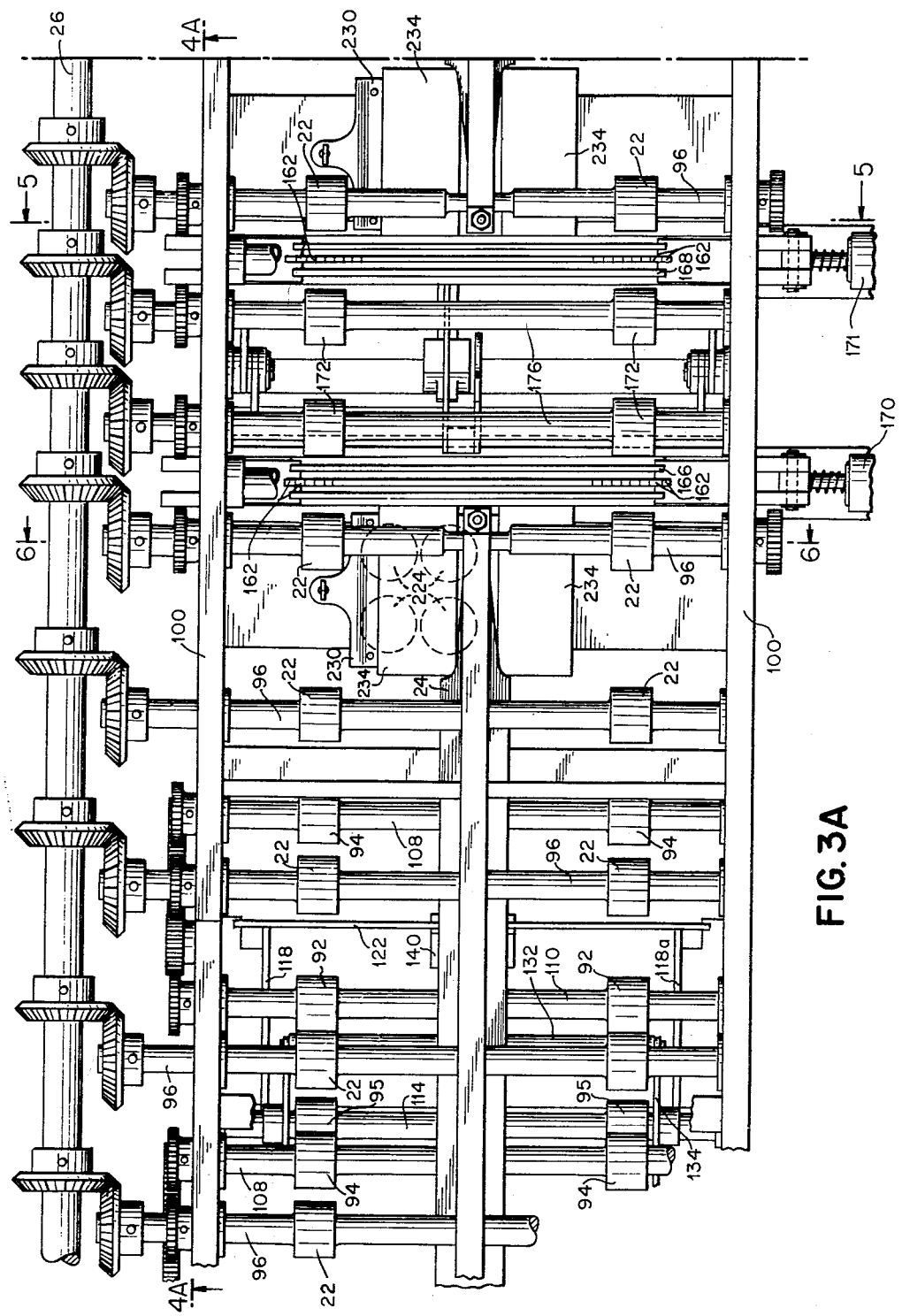
Figure 3B:
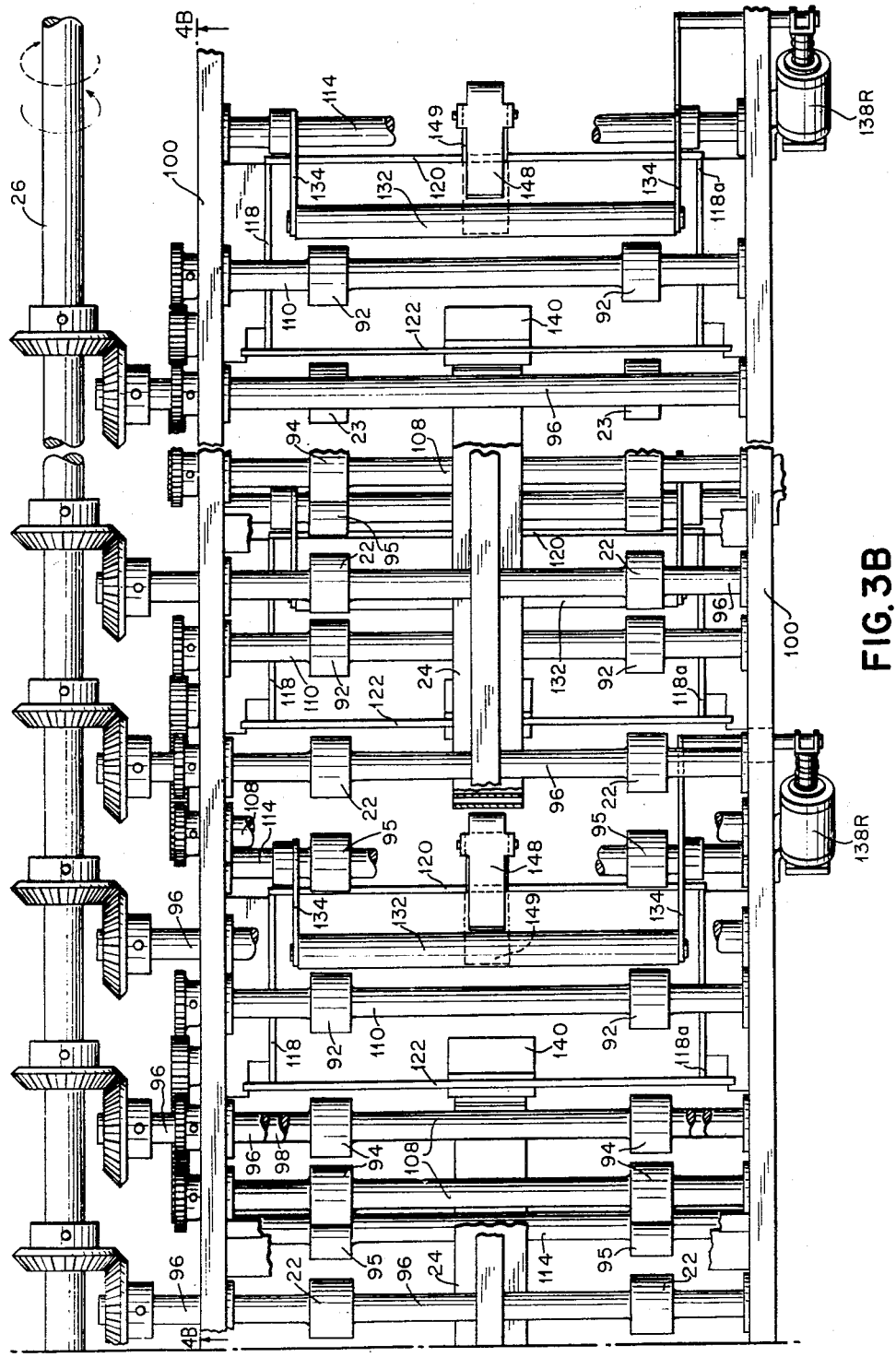

FIGS. 3A and 3B taken together constitute a plan view of the parts shown in FIGS. 2A and 2B, with some upper structure broken away to show lower details.

Figure 4A:
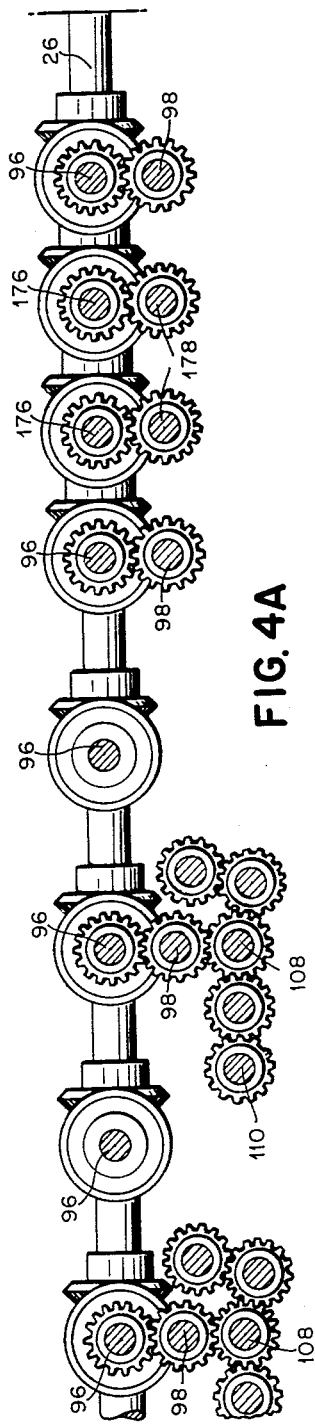

FIG. 4A is a sectional view taken on lines 4A—4A of FIG. 3A.

FIG. 4B is a sectional view taken on lines 4B—4B of FIG. 3B.

Figure 5:
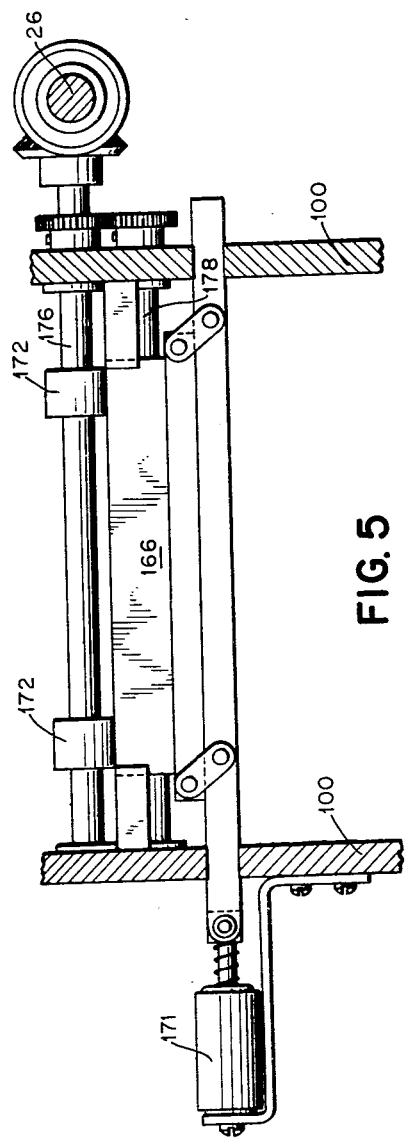

FIG. 5 is a sectional view taken on lines 5—5 of FIG. 3A.

FIG. 6 is a sectional view taken on lines 6—6 of FIG. 3A.

FIG. 7 is a sectional elevation of the reversible drive mechanism.

Figure 8:
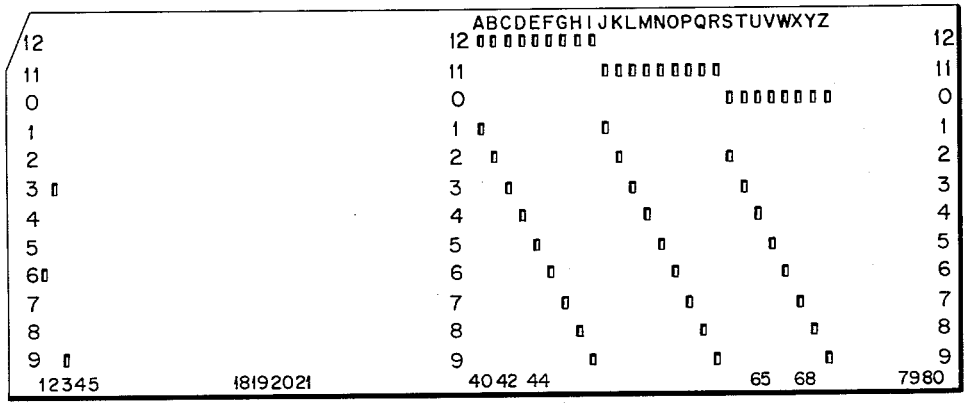

FIG. 8 shows a record card of the type utilized with the machine.

Figure 9:
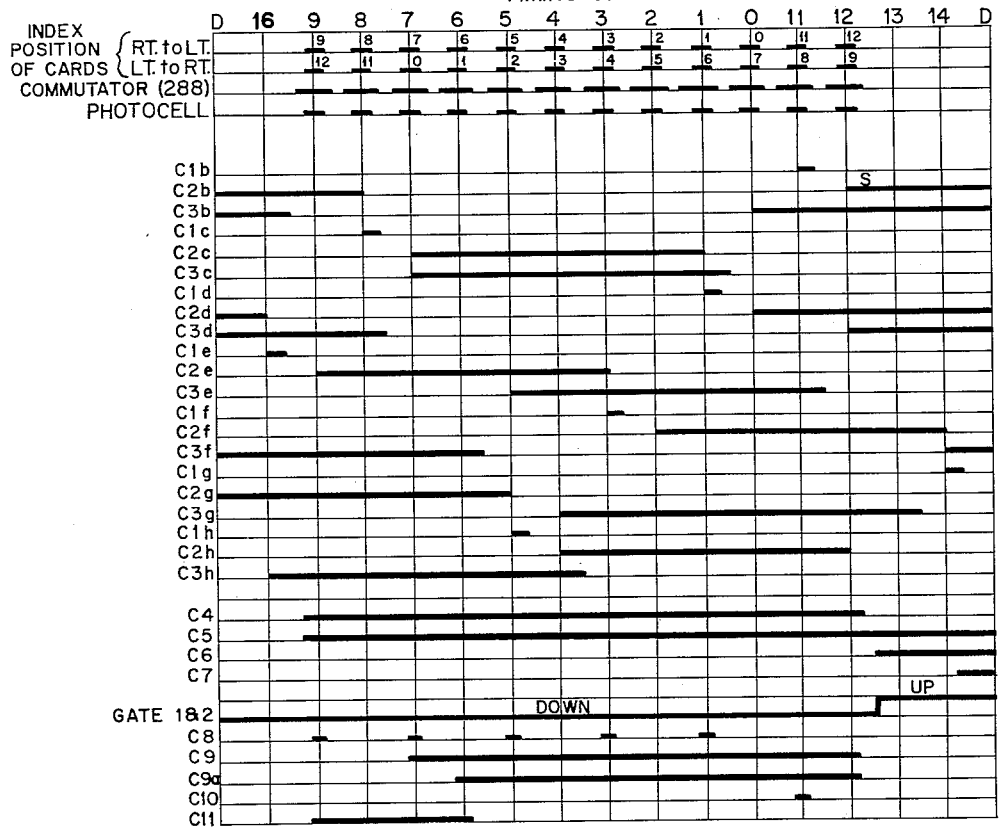

FIG. 9 is a timing diagram for the machine.

FIGS. 10A, 10B and 10C constitute a wiring diagram for the machine.

FIG. 11 indicates the manner of arranging FIGS. 10A, 10B and 10C.

*General description*

As shown in FIG. 1, the machine comprises a sensing station, which is generally designated 10, located between two groups of card pockets 14 and 12. The group of pockets 14 is designated as the Right group and the group of pockets 12 is designated the Left group. The Left group has two pockets, an odd pocket and an even pocket, and the Right group has seven pockets, five of which, bearing designations A through E, are utilized in numeric sorting. The Right group also includes a pocket designated F, which is utilized in alphabetic sorting, and a reject pocket designated R.

The machine is driven by a motor 16 through reversible drive mechanism, later to be described, which drives a plurality of card feed rolls 22 and 23 provided to process the cards from one group of pockets to the other. The sensing station 10 comprises two rows 18 and 20 of photoelectric sensing devices. The left row 18 is controllable to sense cards during a Right to Left sort operation and the right row 20 is controllable to sense cards during a Left to Right sort Operation.

The cards to be sorted are of the "IBM" type, an example of which is shown in FIG. 8, and are placed face down in the Right card pockets 14. A pair of switches, later to be described, are set to designate the lowest order column of the field to be sorted and the number of columns in this field. A start key is then depressed and the feed mechanism, including rolls 22 and 23 in FIG. 1, is driven to feed cards from right to left. The cards placed in the Right pocket 14 nearest the sensing station 10 are then fed individually therefrom to the sensing station where they are sensed by the left row 18 of sensing devices. A single chute blade 24 (FIG. 2A) is controllable by these sensing devices to direct the card being fed into the proper one of the card pockets 12 of the Left group according to whether the digit sensed is odd or even. This procedure is continued until all of the cards are fed successively from all of the Right pockets and sorted properly into the Left pockets, at which time the reversible drive mechanism is controlled to drive the feed mechanism so as to feed cards from left to right. During the left to right operation, cards are first fed from the even pocket 12 and then from the odd pocket 12, and the chute blades 24, shown in FIG. 2B, are controllable by the sensing devices to direct the cards into pockets of the Right group according to the data sensed. There are six of these chute blades 24 associated with the Right group of pockets, and during a numeric sorting operation these blades are effective to direct the even cards bearing the digits 0, 2, 4, 6 and 8 into the pockets A, B, C, D and E, respectively, and then the odd cards bearing the digits 1, 3, 5, 7 and 9 into these same pockets in the same respective order. These two sorting operations are effective to arrange the cards in ascending sequence according to a single order of decimal data and, where a multi-order field is being sorted, these back and forth operations are repeated for each order of the field. After the completion of the sorting operation for the highest order of the field being sorted the cards may be removed in the desired sequence from the Right group of pockets. Where the sort field is alphabetic it is necessary to repeat these two sorting operations twice for each order of the field. Alphabetic information is recorded on "IBM" records in combinations of zone and numeric perforations and where the sort field is alphabetic it is necessary to repeat these two sorting operations twice for each alphabetic order of the sort field, the first two operations being effective to arrange the cards according to the numeric information in the particular order being sorted and the second operations being effective to arrange the cards according to the zone information in the particular order.

*Functional units*

*Reversible drive mechanism.*—Referring to FIG. 7, there is shown the reversible drive mechanism which couples the drive motor 16 to a horizontal shaft 26 which in turn drives the various card feed rolls which transport cards between the card pockets. This mechanism is under the control of a pair of solenoids 28 and 30, one of which is always energized when the machine is in operation. When solenoid 28, the Right to Left solenoid, is energized, shaft 26 is driven in the direction indicated by the full line arrow shown in FIG. 7. Rotation of the shaft 26 in this direction will cause the feed rolls 22 and 23 to be driven to feed cards from the Right to the Left group of pockets shown in FIG. 1. If solenoid 28 is deenergized and solenoid 30 is energized, then the direction of rotation of shaft 26 is reversed and the feed rolls are driven to feed cards from the Left group of pockets to the Right group of pockets. The manner in which the reversing of the drive to horizontal shaft 26 and the feed rolls driven thereby is accomplished is described in the above mentioned copending application Serial No. 556,502 and since the mechanism per se forms no part of the present invention, the above general functional description is deemed adequate for the purpose of this disclosure. However, note should here be made of the fact that the design of the mechanism is such that a single energization of either solenoid 28 or solenoid 30 effects a single revolution of a single revolution clutch element 68 or 42 associated therewith, to cause the various feed rolls to be moved peripherally a distance of four inches which in the present machine is equivalent to one card cycle. Details of single revolution clutches of this type are shown and described in Patents No. 2,131,919 and 2,265,441, issued, respectively, on October 4, 1938, and December 9, 1941; and the operation of the single revolution clutches shown in FIG. 7 is described in more detail in copending application, Serial No. 556,502. The cards utilized are, as previously mentioned, "IBM" type record cards, which are three and one-quarter inches wide. Cards are fed in the direction of this dimension thus allowing for a space of three quarters of an inch between successively fed cards. Since each of the cards include 12 index point positions which are spaced one-quarter inch apart, it is convenient to refer to such a card cycle as a 16 point cycle.

Reference should also be made here to a group of circuit breaker cams generally designated 86 in FIG. 7. As there shown, these cams are secured to a shaft 88, which shaft is drivably connected through gears 90, 36 and 34 to a motor drive shaft 32. Motor shaft 32 is continuously rotating and thus the cams are continuously driven in the same direction. The gearing is such that these cams complete one revolution for each 16 point card cycle. Circuit breaker contacts not here shown are associated with each of these cams and are operated to control machine operations in a manner which will be later described with reference to the circuit diagram.

*Card feed mechanism.*—The cards are fed in the machine by a plurality of feed rolls which may be generally classified in three groups. The first of these comprises the horizontal rows of the upper feed rolls 22 secured to shafts 96 and lower feed rolls 23 secured to shafts 98, which are provided to feed the cards back and forth between the pockets 12 and 14. The second group comprises those feed rolls which are associated with each card pocket and are provided to feed cards into and out of the respective pockets. Referring to FIG. 2B, this second group includes the single set of feed rolls 92 on a shaft 110 located above each pocket and two pair of associated upper and lower feed rolls 94 and 95, secured to shafts 108 and 114, respectively and located between the pockets and the aforementioned horizontal rows of feed rolls 22 and 23. The third group comprises the feed rolls 172 and 174 which are secured to shafts 176 and 178, respectively and are provided to feed cards through the sensing station. All of these feed rolls are driven from shaft 26 in a manner which is described in detail in the aforesaid copending application, Serial No. 556,502. It is deemed sufficient for the purposes of this disclosure to state that with solenoid 28 energized, these feed rolls are driven in a proper direction to feed cards from right to left and with solenoid 30 energized these same feed rolls are driven in a proper direction to feed cards from left to right.

*Card pockets.*—As shown in FIGS. 2A, 2B, 3A and 3B and as described in detail in the above mentioned copending application, each pocket 14 is formed of a pair of guide members 118 and 118a and a pair of side plates 120 and 122 which together form suitable means for aligning and holding aligned cards which are carried therein on a movable platform 126. Each platform 126 is, as shown in FIG. 2B, carried on a vertical tube 128 which is slidably mounted in a lower support member 135 and biased by an associated compression spring 130 against an associated idler roll 132. Each idler roll 132 is carried by an associated pair of arms 134 which are freely mounted on one of the shafts 114, and each is pivotable under the control of an associated solenoid, the solenoids associated with pockets in the Right group being designated 138R and those associated with pockets in the Left group being designated 138L.

Each side plate 122 is movable vertically and each is slotted at its upper end to provide a space through which cards may be fed. Cards being fed through this slot are guided by a throat assembly comprising a knife extension 142 and a curved guide member 140 carried on each plate 122. When cards are initially placed in a card pocket 14 anticipatory of a sorting operation, the cards and pocket structure are in the position shown for the 9 pocket in FIG. 2B. The spring 130 is urging platform 126 upward, but the cards are being held away from the feed roll 92 by idler roll 132. Associated with each of the pockets is a pocket contact assembly 146 operated under control of an associated lever 148, which is biased so that in each assembly 146 a pair of contacts 146a and 146b are normally open and a pair of contacts 146c and 146d are normally closed. When cards are placed in a pocket, lever 148 is moved out of a recess 149 in platform 126 thereby causing it to transfer the contacts in the associated assembly 146. The machine is designed so that the pockets nearest the sensing station will be the first to be fed from. Thus, with cards placed in the Right group of pockets, as shown in FIG. 2B, the solenoid 138R associated with the R pocket 14 will be energized under the control of the contact assembly 146. Energization of this solenoid 138R causes arm 134 to be pivoted clockwise to raise idler roll 132 to the position shown in FIG. 2B for the R pocket 14. Raising of idler roll 132 will, as shown, allow the platform 126 to be raised by the compression spring 130 until the top card in the pocket contacts feed rolls 92 which rolls are then effective to feed this card through the throat in movable side plate 122, which is raised by the cards to the position shown. Solenoid 138R is held energized for a time sufficient to allow the trailing edge of this card to be advanced past idler roll 132, by which time the leading edge of the card will have reached the bite of the feed rolls 94 and 95 adjacent the pocket. Shortly thereafter solenoid 138R is deenergized allowing the parts to return to their normal condition which is the condition shown for the 9 pocket 12, in FIG. 2B. The card 11 thus fed is advanced by the upper and lower feed rolls 94 and 95 to the adjacent rolls 22 and 23 of the horizontal rows, which rolls transport the card toward the sensing station 10.

During each successive card cycle, solenoid 138R is similarly energized and deenergized so that a card will be fed from the R pocket 14 each cycle until the pocket is emptied. Feeding of the last card from the R pocket will cause the contacts in the assembly 146 associated therewith to be transferred. The transfer of these contacts will, through machine circuitry later to be described, cause the solenoid 138R, for the next pocket 14 in which cards have been placed, to be energized during the next card cycle. Cards will be fed in a similar manner from this and from succeeding pockets 14 until all of the pockets have been emptied. The cards, thus fed, are advanced to the sensing station 10 where they are successively sensed by the Left row 18 (FIG. 2A) of the photoelectric sensing device and directed by the chute blade 24 controlled thereby to the proper pocket 12 of the Left group. The stacking operation in these pockets 12 is the reverse of the feeding operation above described. The chute blade 24 directs the cards 11 to the rolls 94 and 95 associated with the proper pocket. These rolls and the guide member 156 direct the cards to the throat assembly for the pocket. As the leading edge of the card being stacked is fed to and through the throat assembly, the solenoid 138L associated with the pocket is held deenergized so that the parts are in a position shown in FIG. 2A for the even pocket 12. After the leading edge of the card has been fed by rolls 94 and 95 into the space between feed roll 92 and platform 126, the solenoid 138L is energized allowing the platform to raise the card until it contacts feed roll 92. Feed roll 92 then advances the card under the raised idler 132 until the card abuts the outer side plate 120, at which time solenoid 138L is deenergized and the pocket structure returned to its normal position with the card properly stacked on platform 126. This operation is repeated until all of the cards originally placed in the Right group of pockets 14 are stacked in either the odd or even pocket in the Left group of pockets 12, at which time the machine drive is reversed and the cards are similarly fed out of these pockets 12 through the sensing station 10 into the Right group of pockets 14.

*Sensing mechanism.*—Sensing of the indicia in the columns of the cards 11 being fed through the sensing station is accomplished by two rows 18 and 20 of photoelectric sensing devices, the structure of which is the same as described in detail in the above mentioned copending application. The left row 18 is controlled to sense cards during a Right to Left oeraption and the right row 20 during a Left to Right operation and each row includes 80 conductive rods 162 arranged so that each coincides with one column of a record being fed through the sensing station. These rods in each row receive light from a corresponding tubular light source 160 and the lower ends of the rods are aligned with individual photocells 164. These photocells detect, according to the amount of light transmitted thereto, the presence or absence of holes in the corresponding columns of a card being fed through the sensing station 10 and the design is such that the photocells 164 will be rendered conductive only when a hole is punched in the corresponding column of the card 11. The time during the card cycle when a photocell 164 is rendered conductive is indicative of the particular index point position at which the hole has been punched.

In FIG. 9 there is shown a timing diagram for the machine. The diagram is representative of a single card cycle of machine operation which, as has been previously noted, is a 16 point cycle. When cards are to be sorted they are placed in the Right group of pockets 14 with their 9 edge nearest the sensing station 10 so that, during the ensuing Right to Left feeding, the 9 index point positions are the first presented to the then responsive left row 18 of sensing devices. During the second sort which is a Left to Right operation the 12 edge and thus the 12 index point position are first presented to the right row 20 of sensing devices which are responsive during this type of feeding.

In order that the cards may be fed past these sensing devices in the proper timed relationship, a pair of gates 166 and 168 is provided. Gate 166 is operated during a Right to Left operation to register the cards being fed immediately before they are advanced past the left row 18 of sensing devices. Gate 168 is similarly operated during a Left to Right operation to register the cards with respect to the right row 20 of sensing devices. The timing of the circuitry controlling the solenoids 138R and 138L, associated with the card pockets, and the distance between the pockets 12 and 14 and the gates 168 and 166, respectively, is such that a card being fed in either direction will reach the register gate for that direction of feeding shortly before the beginning of a card cycle. The gates 166 and 168 are constructed and operated in the same manner under the control of solenoids 170 and 171, respectively, and the operation of these gates, as well as that of the slip rolls 172 and 174, which are operated under control of a solenoid 196, is described in detail in the above mentioned copending application. It is deemed sufficient for the purpose of the present disclosure to state that this structure is effective to accurately time the feeding of cards in either direction through the sensing station.

*Pocket selection mechanism.*—Cards being fed through the machine are directed to the proper pockets by a pair of pocket selection units 220 and 222 associated, respectively, with the Left and Right groups of card pockets. The unit 220 is controllable by the sensing devices in row 18 to direct cards into pockets 12 according to the indicia sensed during a Right to Left machine operation. As shown in FIGS. 2A, 3A and 6, unit 220 includes a bank of four magnets 224 secured to a frame assembly 226 mounted between side frames 100. Associated with the magnets 224 is an armature 230 which is mounted on a knife edge 228 provided on frame assembly 226. Armature 230 is normally biased away from the magnets 224, to the position shown, by a tension spring 232. The extent of the clockwise pivoting of armature 230 under influence of spring 232 is limited by a pair of backstops 233 mounted on one of a pair of plates 234 carried on frame assembly 226. These plates are level with the bite of the feed rolls 22 and 23 and form a platform to guide the cards being fed through the pocket selection unit 220. Located above the armature 230 is a single chute blade 24, one end of which is biased to rest on the armature in the manner shown in FIG. 2A. The other end of this blade extends to a set of guide plates 156 which are provided to guide cards being fed into and out of the odd pocket 12. The tip of the blade 24, resting on armature 230, is bent upwards so that a card being fed through the unit in the condtion shown, passes under this blade. A card, thus fed, is advanced to the second set of feed rolls 22 and 23, at which time a lip extension 24a on the chute blade 24 directs it between the guide plates 156 to the feed rolls 94 and 95 associated with the even pocket 12. These rolls advance the card to this pocket for stacking in a manner previously described.

When the magnets 224 are energized under control of the photoelectric sensing devices sensing a hole in a card being fed, the armature 230 is attracted and the biased blade 24 tends to follow the armature as it is pulled downward against an armature stop 238, thereby allowing the card sensed to be fed over this blade and directed to the odd pocket 12 by a lip extension 24a mounted to the frame above the end of the chute blade 24.

The single chute blade associated with unit 220 is located at the extreme left of this unit as is shown in FIG. 2A. The distance between the tip of this blade and the row 18 of photoelectric sensing devices is such that the leading edge of a card being fed Left to Right will be just to the right of the tip of this blade when the last index point position, which for Left to Right feeding is the 12 index point position, is coincident with the sensing devices in row 18. When the digit sensed in a card being fed is odd, circuitry, later to be described, is effective to energize and hold energized the magnets 224 until the leading edge of the card passes over the tip of blade 24 thereby causing the cards to be fed over this blade and stacked in the odd pocket 12. When the digit in the column being sorted on is even, magnets 224 are not energized and the card is fed under blade 24 and stacked in the even pocket 12.

The other sensing unit 222, which is provided to direct cards being fed Right to Left into pockets 14 in the Left group, is of similar construction, the only difference being that there are six chute blades 24 associated with this unit. These blades are of varying length, the top blade extending to the guide plates 156 associated with the F pocket 14 in the Right group, the next lower blade to the guide plates 156 associated with the E pocket 14, etc. Each of these blades has formed on its under side a lip 24a which is located above the blade immediately below it. A similar extension 24a is mounted to the frame of the machine above the top chute blade which extends to the F pocket 14.

The tips of these chute blades 24 are formed in the same manner as the single chute blade 24 associated with the unit 220 and are similarly biased to follow an armature 230 operated under control of a bank of sort magnets 224. The arrangement of these blades with respect to the row 20 of sensing devices is such that the leading edge of a card being fed right to left will be just to the left of the top of the F blade 24 when the "11" index point positions, which are the second positions sensed during left to right feeding, as coincident with the sensing devices in row 18. The distance between the tips of the blades is twice the distance between index point positions on the cards and thus, a card being fed will be in a similar position with respect to the next lower or E blade 24 when the "1" index point position is coincident with row 20, with respect to the D blade when the "3" index position is coincident with row 20, etc. Thus, where the magnets 224 are energized in response to either a "12" or "11" perforation, the card sensed is fed over the F blade to the F pocket 14; when energized in response to either a "0" or "1" perforation, the card sensed is fed under the E blade and over the E blade to the E pocket 14; when energized in response to a "2" or "3" perforation, the card sensed is directed under the E blade and over the D blade to the D pocket 14, etc.

It should also be noted that, when cards are fed out of any pocket 12 or 14 to the sensing station, they are also fed over the chute blade 24 associated with the particular pocket. The extension 24a on the next higher blade will, as before, guide the cards into the passage formed by the two blades. The blades 24 are so formed at their ends nearest the sensing station that they will not interfere with feeding of cards in this direction.

*Circuit description*

The electric circuitry which controls the above described mechanism will now be described with reference to an illustrative sorting problem. The cards 11 to be sorted are of the well-known "IBM" type, an example of which is shown in FIG. 8. In the problem to be described, a group of cards are to be arranged in sequential order according to the numeric information contained in a field comprising columns 1, 2, and 3 of each card. The card shown in FIG. 8 has the number 639 punched in this field. This card and the other cards of the group to be sorted are placed face down in the Right group of pocket 14. The machine operation will be described with reference to FIG. 1A which schematically shows the position of the cards in the pockets initially, and after each machine operation until the sorting is completed. In the preferred embodiment of the machine herein disclosed, the card carrying capacity of each of the individual pockets is approximately 500 cards, it being understood that this capacity might be increased or decreased by varying the depth of the pockets. In the illustrative example being described, the cards are initially placed four in a pocket in order to more simply explain the operation of the machine. Since the cards are to be fed successively from the pockets 14 nearest the sensing station, they are advantageously placed in the R, A and B pockets 14, as shown in FIG. 1A. In that figure each card is shown schematically with the information punched in the sort field, columns 1, 2 and 3, identifying the card; i.e., the card shown in detail in FIG. 8 is, as shown in FIG. 1A, initially placed in the machine as top card in the R pocket 14 of the Right group and is identified by number 639 which is representative of the punching in columns 1, 2 and 3 of that card.

With the cards thus placed in the machine, it is first necessary to set a number of switches and thereby render them effective to control the machine to properly sort the cards on the desired field. Since the field is numeric, a switch 298, the terminals of which are shown in FIG. 10B is thrown to the N position. A stepping switch 299, shown schematically in FIG. 10B is set in the 1 position.

A column select switch 272, shown in FIG. 10C, is set according to the column representing the lowest order of the field being sorted which, in the present case, is column 3. A sort control switch 274, shown in FIG. 10C, is set according to the number of columns contained in the field being sorted, which in the present case is three. With these switches set, a main line switch 249 is thrown to the ON position thereby supplying power to a positive potential line 252 (FIG. 10A) and a negative potential line 254 (FIG. 10B).

The placing of the cards in the R, A and B pockets causes the contacts in the assembly 146 (FIG. 10A) for each of these pockets to be transferred so that their $a$ and $b$ contacts are now closed and their $c$ and $d$ contacts open. Thus, when the start key 256 is depressed to initiate machine operation, there is a circuit available to energize relay 1R, which circuit extends from line 252 through conductor 258c, the contacts 146b associated with R pocket 14, start key contacts 256a, relay magnet 1R, the normally closed stop key contacts 260a, and relay contacts 3Ra to negative potential line 254. Relay 1R is held energized by a circuit extending from the relay through the now closed 1Rb contacts to line 252. Energization of relay 1R closes the 1Ra contacts to complete a circuit from line 252 through the contacts 1Ra and motor 16 to negative potential line 254. A parallel circuit also energizes relay 2R at this time. With drive motor 16 thus energized, its shaft 32 (FIG. 7) is rotated. With relay 2R energized, a circuit is available to energize the Right to Left solenoid 28 to thereby cause the main drive shaft 26 to be driven in the proper direction for Right to Left feeding. This circuit extends in FIG. 10A from line 252 through conductor 258C, contacts 2Ra now closed, and contacts 294a, to and through the solenoid 28 to line 254. A parallel circuit extends from the contacts 294a through the now closed pocket contacts 146a associated with the R pocket 14, to and through the coil of relay RR, and thence to line 254. The energization of relay RR conditions the machine to initiate the feeding of cards from R pocket 14.

As previously described in connection with FIGS. 2A and 2B feeding from the pockets 12 and 14 is accomplished under the control of the solenoids 138L and 138R, respectively, associated therewith. Since it is necessary that the cards reach the proper register gate 166 or 168 shortly before the end of a card cycle, the feeding from the various card pockets and thus, the energization and deenergization of the solenoids 138R and 138L must be accurately timed. This is accomplished by a plurality of the circuit breaker cams 86 (FIG. 7) which operate two groups of cam contacts C1b through C1h, and C2b through C2h to control the energization and deenergization of the solenoids 138L and 138R during feeding from the various pockets. A third group of contacts, C3b through C3h control the operation of these solenoids when cards are being stacked in the pockets. The timing of these cam contacts is shown in FIG. 9 and their connection in the electrical circuitry in FIG. 10B. The timing of each of the contacts is such that the solenoids controlled thereby are energized to initiate feeding from the pockets at the proper time to cause the cards being fed to reach the proper register gate at 14 time which, as shown in FIG. 9, is one cycle point before the end of the sixteen point card cycle. Referring to FIG. 10B, the circuitry which contorls the feeding from the R pocket 14 of the Right group and the even pocket 12 of the Left group is shown within the box therein designated K$b$. There are seven such boxes in FIG. 10B and, in each, the particular pocket or pockets for which the included circuitry controls feeding, is designated. It should be noted that the boxes K$d$ through K$h$ include circuitry for one pocket of the Right group, and that the boxes K$b$ and K$c$ include circuitry for one pocket of the Left group and for one pocket of the Right group and that the pockets thus associated are equally distant from the sensing station 10 (FIG. 1). The reason for the latter arrangement lies in the fact that the timing control for the solenoids 138R and 138L of the associated pockets may be the same since the pockets are equidistant from their respective register gates 166 and 168. There is shown in detail, as illustrative of the circuitry included in boxes K*b* and K*c*, the circuitry for the R pocket of the Right group and the even pocket of the Left group within the box designated K*b*, and, as illustrative of the circuitry within the pockets K*d* through K*h*, the circuitry for the B pocket of the Right group within the box designated K*d*.

With relay RR energized, as above described, a circuit is available at 11 time of the next card cycle to energize the relay B32. Relay B32 is associated with the circuitry controlling feeding in the R pocket of the Right group and the even pocket of the Left group. This energizing circuit extends in FIG. 10B from line 252 through cam contacts C1*b*, the pick coil of relay B32, contacts RR*a* now closed, and conductor 332 to negative potential line 254. Relay B32 is then held energized by a parallel circuit extending from its hold coil through the now closed B32*a* contacts to line 252.

With relay B32 energized and its "*b*" contacts thus closed, it is possible at 12 time of this card cycle, when cam contacts C2*b* are closed, to complete a circuit to energize the solenoid 138R for the R pocket 14 of the Right group. This circuit extends from line 252 through cam contacts C2*b*, the now closed relay contacts B32*b* and RR*b*, solenoid 138R, and conductor 332 to negative potential line 254. Energization of solenoid 138R, in the manner above described with reference to FIG. 2B, causes the idler roll 132 associated with the R pocket 14 to be raised thereby allowing the top card to be fed out of the pocket by feed roll 92. When cam contacts C2*b* are opened at 8 time of the next following card cycle, solenoid 138R is deenergized thereby lowering idler roll 132 and the remaining cards in the pocket. This operation is repeated during each succeeding cycle until the four cards originally placed in the R pocket 14 have been fed therefrom. Each of these cards begins to be moved from the pocket at 12 time of a card cycle and the distance from the pocket to the register gate 166 is such that at 14 time of the fourth card cycle thereafter the leading edge of the card fed reaches register gate 166.

The feeding of the last card out of the Right pocket 14 causes the contacts in the assembly 146 associated therewith to be restored to their original position. Restoration of these contacts deenergizes the relay RR, thereby restoring contacts RR*a* and RR*b* to their normal open condition. The opening of contacts RR*a* deenergizes relay B32 and the opening of contacts RR*b* deenergizes the solenoid 138R associated with the R pocket 14. With the contacts of the assembly 146 restored to their original position, a circuit is now available to energize relay RA (FIG. 10A) and thereby condition the machine to feed cards out of the A pocket 14 of the Right group. This circuit extends from line 252 through conductor 258*c*, relay contacts 2R*a* now closed, contacts 294*a*, the "*c*" contacts of the assembly 146 associated with the R pocket, the now closed "*a*" contacts of the assembly 146 associated with the A pocket, to and through relay RA and thence to line 254. Energization of relay RA closes its contacts (not shown), which contacts are connected in the circuitry provided to control feeding in the A pocket of the Right group and 12 pocket of the Left group. This circuitry is, in FIG. 10B, represented by the box K*c* and the closing of these contacts, in a manner similar to that above described in connection with feeding from the R pocket 14, causes the solenoid 138R associated with the A pocket 14 of the Right group to be energized and deenergized each card cycle. The energization of this solenoid is under the control of the cam contacts C1*c* and C2*c*, the timing of which is shown in FIG. 9B. The timing is such that at 7 time of the card cycle following that during which feeding of the last card out of the R pocket was initiated the solenoid 138R for the A pocket is energized to initiate feeding from this pocket. Initiating feeding of a card from the A pocket at 7 time causes the card thus fed to reach the gate 166 at 14 time of the fifth card cycle following thereafter. As has been noted, the usual space between successively fed cards is three-quarters of an inch and the cards are advanced a distance of four inches each card cycle. Due to the distance between the pockets, the spacing between the trailing edge of the last card fed from the R pocket and the leading edge of the first card fed from the A pocket is approximately four and three-quarter inches. This spacing does not interrupt the machine operation, since, as will be later explained, motor 16 continues to run until a relay 3R is energized at the completion of the sorting operation.

Once initiated, the feeding from the A pocket continues until all of the cards have been fed therefrom, at which time the contacts of the associated assembly 146 are restored to their original condition to thereby deenergize relay RA. Restoration of these contacts allows the relay RB to be energized by a circuit extending through the now closed "*a*" contacts of the assembly 146 associated with the B pocket. Energization of the relay RB conditions the machine to feed cards out of the B pocket which feeding continues until that pocket is also empty.

As this feeding of the cards from the succeeding pockets is taking place the leading edge of the first card fed from the R pocket 14 will have reached gate 166. A circuit is available shortly before 13 time of each card cycle to energize solenoid 170 and thereby cause gate 166 to be raised by 14 time, at which time the leading edge of the card being fed reaches this gate. This circuit extends in FIG. 10C from line 252 through cam contacts C6 which, as shown in FIG. 9, are closed shortly before 13 time, relay contacts 40R*e*, to and through solenoid 170, and thence to negative potential line 254. Shortly after 14 time, when the card has contacted gate 166, cam contacts C7 are closed and a parallel circuit is available to energize solenoid 196. The energization of this solenoid, in a manner previously described, causes the lower feed rolls 174 at the sensing station to be pivoted, which pivoting allows these rolls and the associated rolls 172 to slip on the card. At D time cam contacts C6 and C7 are opened and solenoids 170 and 196 deenergized to allow gate 166 to be lowered and feed rolls 172 and 174 to again operatively engage the card. The card is then fed by these feed rolls past the row 18 of the sensing devices in the proper timed sequence, the 9 index point position being coincident with the sensing devices at 9 time (FIG. 9), the 8 index point position at 8 time, etc. The actual sensing of the indicia in the column being sensed is under the control of a commutator cam 288, the contacts 288*a* of which are operated at the times shown in FIG. 9. The particular photocell in row 18, which is responsive to actuate the chute blades 24, is determined by the setting of switch 272, which switch for the operation under consideration is originally set for the column 3.

In order to eliminate undesired operation of the photocells 164, a pair of card lever contacts 206 (FIG. 2A) which are operated by a card lever 200 and contact operating arm 204 mounted on a stud 202, are connected in the circuit to condition the machine for the sensing operation. This circuit extends in FIG. 10B from line 252 through card lever contacts 206, to and through relay 34R, and then by conductor 332 to line 254. Unless relay 34R is energized and its contacts 34R*a* are closed, no sensing will be accomplished. To ensure that relay 34R remains energized until a card has been advanced completely past the row of sensing devices, a hold circuit is provided which circuit extends in FIG. 10B from line 252 through cam contacts C4, relay contacts 34R*b*, to and through relay 34R, and thence, as before, to line 254. The trailing edge of each card fed does not allow the card lever contacts to open until after 9 time in the card cycle during which the card is to be sensed. At this time cam contacts C4 have been closed and will remain closed to hold relay 34R energized during the entire sensing portion of that cycle.

When the first card of the group fed from the R pocket 14 is being fed past row 18 of sensing devices, relay 34R is energized in the manner above described thereby conditioning the circuitry for sensing the 9 which is punched in column 3 of that card. The light sources 160 receive their power from a circuit which extends in FIG. 10A from line 252 through the contacts 2R$a$, and the light sources 160 in parallel to negative potential line 254. The photocells 164 in both rows 18 and 20 of sensing devices, as is shown in FIG. 10C, have their cathodes 164$a$ each connected through series connected resistors 164$c$, 164$d$ and 164$e$ to a negative potential terminal 370. A further connection from this negative potential terminal 370 to each of the cathode circuits of the photocells extends from the junction 372 in the cathode circuit to a corresponding one of terminals 272T on a terminal ring 272$g$ on switch 272. There are 80 terminals 272T, one for each column of the card, on ring 272$g$ and this terminal is fabricated of insulating material so that the terminals are insulated one from the other. To each of the terminals 272T there is connected a spring contact 272$e$ which bears against the outer portion of a rotatable conductive ring 272$a$. This outer portion of the ring 272$a$ is provided with an insulating segment 272$s$, which is imbedded in the ring and is flush with the surface of the ring to allow it to be rotated with the ring without damaging the spring contacts 272$e$. The spring contact 272$e$ for the terminal corresponding to the column for which the switch is set, which for the present problem is column 3, bears against the insulating segment 272$s$. The spring contacts 272$e$ for the terminals corresponding to the remaining 79 columns bear against the outer conductive portion of ring 272$a$ which is maintained at the potential of terminal 370 by a connection from this negative potential terminal to a further insulated terminal 272$t$ on the terminal ring 272$g$ from which a spring contact 272$f$ extends to make contact with the inner portion of the rotatable conductive ring 272$a$. Thus, with the exception of the photocell cathode circuit for column 3, on which switch 272 is set, each of the terminals 372 is selectively connected directly through switch 272 to negative potential terminal 370, whereas for the cathode circuit of the photocell for column 3 the insulating segment 272$s$ prevents the completion of the circuit through switch 272 and the only connection from junction 372 to negative potential terminal 370 is through the resistor 164$e$.

At 9 time of the card cycle under consideration, light from light source 160 is allowed by the hole punched in column 3 of the card to be transmitted by the associated rod 162 to the cathode 164$a$ of the photocell 164 associated with column 3. This photocell 164 is thus made more conductive and an increased current flows through a circuit which extends in FIG. 10B from line 252 through stepping switch 299 at segment 1, cam contact C8, the now closed contacts 34R$a$, cam contacts 288$a$ (FIG. 10C), the anode 164$b$ and cathode 164$a$ of photocell 164 for column 3 of the left row 18 of sensing devices and resistors 164$c$, 164$d$ and 164$e$ to the negative potential terminal 370. A parallel circuit, which extends from a junction 372 between resistors 164$d$ and 164$e$ to the 3 terminal of switch 272, is not now available since this terminal of the switch is insulated from ring 272$a$. The increased current flow in the above described circuit raises the potential at a junction 374, which junction is located between resistors 164$c$ and 164$d$ and is connected to the grid 282$a$ of a triode 282. This triode is now rendered conductive to complete a circuit from a ground potential terminal 376 through the cathode 282$b$ and anode 282$c$ of the triode, and thence through a conductor 338, the Right to Left sort magnets 224, relay contacts 40R$c$ and relay 35R to the positive potential line 252. Energization of relay 35R closes contacts 35R$a$, thereby providing a hold circuit for this relay and for the sort magnets 224. This circuit extends from terminal 376, contacts 35R$a$, cam contacts C5, relay contacts 40R$d$, magnets 224, contacts 40R$c$ and coil 35R to line 252. As shown in FIG. 9 cam contacts C5 are closed for the remainder of the card cycle, thereby holding the magnets 224 energized until the beginning of the next card cycle.

It should be noted that cam contacts C8, which control the duration of the positive pulse transmitted to the plates of the photocells 164, are closed each cycle at 9 time, 7 time, 5 time, 3 time and 1 time. Thus, the above described circuitry is available to effect energization of the Right to Left sort magnets 224 only in response to an odd perforation sensed in the column being sorted on during a Right to Left numeric sort operation.

The initial energization of sort magnets 224 occurs shortly before 9 time when the commutator contacts 288$a$ and cam contacts C8 are both closed. The hold circuit, above described, is effective to hold the sort magnets 224 energized until the leading edge of the card has been fed over the single chute blade 24 (FIG. 2A) associated with the pocket selection unit 220 operable during right to left sorting. This card will thus be stacked in the odd pocket 12 of the Left group, as will all of the remaining cards having in column 3 a perforation in an odd index point position. Since cams contacts C8 are open when the 0, 2, 4, 6 and 8 index point positions are presented to the row 18 of sensing devices, the cards having in column 3 an even perforation are fed under the single chute blade 24 and stacked in the even pocket 12.

As perforations in other columns of the card being fed are presented to the row 18 of sensing devices, the photocells 164 corresponding to these columns receive light from the light source 160. However, since the terminals 372 of all of the photocells 164, except the one corresponding to column 3, are connected by common ring 272$a$ to the negative potential terminal 370, the junctions 372 between the resistors 164$d$ and 164$c$ in the cathode circuits of these photocells are held at the potential of terminal 370 thereby preventing the associated junctions 374 from being raised to a potential sufficient to render conductive the corresponding triodes 282. This circuit arrangement allows sort magnets 224 to be energized under the control of the photocell 164 associated with the column for which switch 272 is set and thus ensures that sorting will be accomplished on the proper column of the cards.

In order that the cards might be properly stacked in the odd and even pockets 12 of the Left group, the solenoids 138L associated therewith must be energized and de-energized each card cycle. The energization and de-energization of solenoids 138L is accomplished under the control of a plurality of cam contacts C3$b$ through C3$h$. For example, the second card of the group fed from the Right group of pockets 14, which card is identified in FIG. 1A by the number 578, is stacked in the even pocket 12 of the Left group under the control of cam contacts C3$b$. These contacts, as is shown in FIG. 9, are closed at 0 time each card cycle, at which time a card being fed into the even pocket 12 has been advanced to a point where its leading edge is beneath feed rolls 92. At this time a circuit is available extending, in FIG. 10B, from line 252 through cam contacts C3$b$ relay contacts 33R$b$ and solenoid 138L to negative potential line 254. Energization of solenoid 138L, as previously described, raises the associated idler roll 132 allowing platform 126 to be raised and the card to be stacked in the pocket by feed rolls 92. Stacking in the odd pocket 12 in the Left group is accomplished in the same manner under control of one of the cam contacts C3$c$. The cards are thus stacked in the pockets 12 in the manner indicated in the schematic showing of the group after the first sorting operation in FIG. 1A.

In order that the sorting operation be automatically continued by now feeding the cards from the Left group of pockets 12 and directing them into pockets 14 of the Right group in accordance with the digits in column 3, it is first necessary to energize the Left to Right solenoid 30 associated with the reversible drive mechanism. The circuitry is conditioned to energize this solenoid when the last card is fed out of the last of the group pockets 14 into which cards had originally been placed. In the present problem the last card to be fed is the card designated 309 in FIG. 1A, which was the bottom card placed in the B pocket 14. Feeding of this card restores contacts in the assembly 146 associated with the B pocket 14 to their normal condition shown in FIG. 10A, thereby providing a circuit to energize relay 17R. This circuit extends from line 252 through contacts 2R$a$ and 294$a$ now closed, and thence through the "c" contacts of each of the assemblies 146 associated with pockets 14 in the Right group, to and through relay 17R to line 254. Energization of this relay 17R closes contacts 17R$a$ to complete a circuit to a timing motor TM. This circuit extends from line 252 through contacts 2R$a$ and 17R$a$ now closed and timing motor TM to negative potential line 254. Associated with the timing motor and driven thereby through gearing not shown is a timing cam 294. The gearing is such that cam 294 is rotated 180 degrees during the time it takes a card to be fed from the extreme pocket of the Right group, the F pocket 14, to the extreme pocket of the Left group, the odd pocket 12. The purpose of this timing motor and cam 294 is to ensure that all of the cards fed from the Right group of pockets 14 are properly stacked in pockets 12 of the Left group before the machine drive is reversed.

After cam 294 is rotated 180 degrees a lobe provided thereon transfers its associated contacts, opening contacts 294$a$ and closing contacts 294$b$. The opening of contacts 294$a$ breaks the circuit holding relay 17R energized thereby causing contacts 17R$a$ to be opened and timing motor TM to be stopped. Cam 294 is stopped with its high lobe holding the associated contacts in this transferred condition, in which condition, the contacts 294$a$, being opened, cause Right to Left solenoid 28 to be deenergized; and the contacts 294$b$, being closed, now complete a circuit to energize Left to Right solenoid 30 and relays 33R and 40R. This circuit extends, in FIG. 10A, from line 252 through contacts 2R$a$ which remain closed with relay 2R still energized and contacts 294$b$ now closed and then in parallel to and through solenoid 30 and relays 33R and 40R to line 254. Solenoid 30 and relays 33R and 40R are held energized until this second phase of the sorting operation, sorting of the cards from the odd and even pockets 12 into the pockets 14 according to the digits punched in column 3, is completed and timing motor TM is again started. Energization of solenoid 30, as previously described in connection with FIG. 7, reverses the direction of the drive transmitted from motor 16 to the main horizontal shaft 26.

Since two sorting operations are required to arrange the cards in sequence according to a single order of numeric information, this second sorting operation is again based on the data contained in column 3 of the cards. The above mentioned energization of relay 17R also effects the closing of the contacts 17R$b$ to energize both the column select magnet 272M and the sort control magnet 274M. The circuit extends in FIG. 10B from line 252 through contact 17R$b$ transferred, and switch 298 in the N position, to and through magnet 272M (FIG. 10C) to line 254. A parallel circuit extends from magnet 272M to and through magnet 274M and thence to line 254. The stepping mechanism for each of the switches 272 and 274 is the same and the attraction of armature 272A, for example, causes the attached pawl 272P to be moved to the right in FIG. 10C. Another pawl 272B engaging the teeth in ratchet 272R prevents any counterclockwise movement of the unit at this time. However, when magnet 272M is deenergized, as a result of the deenergization of relay 17R opening contacts 17R$b$, the armature 272A is returned to its original position by spring 272S. This movement through pawl 272P causes the ratchet 272R to be rotated one step in a clockwise direction. Common ring 272$a$ is advanced with ratched 272R and the construction of the switch assembly is such that two such stepping movements are required to cause the next contact finger 272$e$ connected to the one of the terminals 272T to be insulated from ring 272$a$ by segment 272$s$. Thus, for this second sorting operation the terminal 272T connected to the junctions 372 in the cathode circuits of the photocells 164 corresponding to column 3 in both the left row 18 and right row 20 of photocells is insulated from ring 272$a$. The photocells in the right row are connected in the circuitry in the same manner as the photocells in the left row and thus, with switch 272 in this condition only the triodes associated with the photocell 164 corresponding to column 3 may be rendered conductive during the second sorting operation. The energization and deenergization of magnet 274M (FIG. 10C) effects a similar clockwise stepping of the ratchet 274R of switch unit 274. Ratchet 272R rotates a disc 274$d$ to which there is attached a lobe 274L which operates a pair of contacts 296. This switch in the operation being considered is originally set on 3 indicative of the number of columns in the sort field and, since two sorting operations are required for each column to be sorted, two stepping operations of the ratchet are required to advance the switch to a setting of 2 and six such operations to cause the switch to assume the position shown with lobe 274L holding contacts 296 closed. The above described energization and deenergization of relay 17R causes contacts 17R$c$ to be momentarily closed thereby completing an energizing circuit to a stepping switch magnet 299M, which circuit extends in FIG. 10$b$, from line 252 through contacts 17R$c$ and magnet 299M to line 254. The energization and deenergization of magnet 299 is effective to advance the stepping switch assembly to the 2 position. With this switch in the 2 position and solenoid 30 and relays 33R and 40R energized the machine is conditioned for a left to right sorting operation.

The energization of relay 40R closes its associated contacts to condition the machine for left to right operation. The transferring of contacts 40R$e$ in FIG. 10C causes the solenoid 171 to now be energized each card cycle under control of cam contacts C6. The right gate 168 is thus raised each card cycle to register the cards 11 with respect to the right row 20 of sensing devices. The transferring of the 40R$c$ and 40R$d$ contacts in FIG. 10C. renders the Right to Left sort magnets 224 non-responsive to the photocells 164 in the Left row 18, and renders the Left to Right sort magnets 224 now responsive to the photocells 164 in the left row 20. The energization of relay 33R transfers its contact assemblies 33R$b$ through 33R$h$, one of which is connected in the circuitry of each of the boxes K$b$ through K$h$, to now place the solenoids 138R of the Right group of pockets 14 under control of the cam contacts C3$b$ through C3$h$. These cam contacts are, as previously described, closed and opened to energize the associated solenoids 138R at the proper times in each card cycle to effect stacking of the cards in pockets 14. The stepping of switch 299 to the 2 position causes the circuit supplying positive potential to the plates 164$b$ of photocells 164 to be under control of cam contacts C9 (FIG. 10B). As shown in FIG. 9, cam contacts C9 are closed from shortly before 7 time to shortly after 12 time of each card cycle. It is during this time of each card cycle that the 0 through 9 index point positions of card being fed left to right are presented to the right row 20 of sensing devices.

In a manner similar to that described for feeding from the Right group of pockets 14, feeding from the odd and even pockets 12 is accomplished under the control of the contacts in the assemblies 146 associated with these pockets. Since cards have been stacked in the even pocket 12 the contacts in the assembly 146 associated with this pocket are now in the transferred condition allowing a circuit to be completed, in FIG 10A, from line 252 through conductor 258C, contacts 2Ra and 294b now closed, and the now closed "b" contacts of the assembly 146 associated with the even pocket 12, to and through the coil of relay LE to line 254. Energization of this relay closes associated contacts LEa (not shown) which are connected in the circuitry here represented by the box Kc. This circuitry controls feeding from the even pocket 12 of the Left group and the A pocket 14 of the Right group. Though not shown in detail this circuitry is similar to that shown within box Kb and causes energization of a relay, which performs the same function as relay B32 shown in box Kb, to place the solenoid 138L associated with the even pocket 12 under control of cam contacts C1c and C2c. This solenoid is energized under control of these cam contacts, the timing of which is shown in FIG. 9, so that the card designated 598, which, as shown in FIG. 1A, is the top card in the even pocket after the first sorting operation, is fed from this pocket to arrive at the gate 168 at 14 time of a card feed cycle. The other cards in the even pocket 12 are fed in the same manner during succeeding card cycles. As the last card is fed from the even pocket 12, the contact assembly 146 associated therewith is restored allowing a circuit to be completed through the transferred "b" contacts of the assembly 146 associated with the odd pocket 12 to energize relay LO. Energization of this relay, in a manner similar to that above described, conditions the machine for feeding out of the odd pocket 12. The card designated 309, shown in FIG. 1A to be the top card in this pocket, is first fed therefrom. Feeding from odd pocket 12 continues until all of the cards stacked in the Left pockets 12 have been fed therefrom, in succession, to be registered by gate 168 and thence advanced past the right row 20 of sensing devices.

As above explained, only the photocell associated with column 3 is now responsive to actuate the Left to Right sort magnets 224. The first card fed during this operation is the card designated 598 in FIG. 1A. At 11 time of the card cycle during which this card is fed past the sensing devices the photocell 164 corresponding to column 3 of the card is rendered more conductive. Note should be made of the fact that it is at 11 time of a card cycle that the 8 index point positions of a card being fed left to right are presented to the right row 20 of sensing devices. Since, as before, relay 34R is energized by the closing of card lever contacts 206, a circuit is available from line 252 to the plate 164b of this photocell. This circuit extends in FIG. 10B from line 252 through stepping switch 299 in the 2 position, switch 298 in the N position, cam contacts C9, contacts 34Ra now closed, commutator contacts 288a (FIG. 10C), to the plate 164b of the photocells 164. Since the photocell in the Right group which corresponds to column 3 is now more conductive, an increased current flows from the plate 164b of this photocell to its cathode 164a and thence through resistors 164c, 164d and 164e to negative potential terminal 370. The potential at the junction 374 is thereby raised to raise the grid 282a of the associated triode 282 above the cut off potential and render the tube conductive. A circuit is then available from ground potential terminal 376 through the cathode 282b and anode 282c of the triode, to and through the Left to Right sort magnets 224, and then through contacts 40Rc now transferred, and relay 35R to line 252. Left to Right magnets 224 and relay 35R are held energized for the remainder of the card cycle by a circuit extending from line 254 through contacts 35Ra now closed, cam contacts C5, relay contacts 40Rd now transferred, to Left to Right sort magnets 224 and thence, as above, through these magnets and relay 35R to line 252. The chute blades 24 associated with these sorting magnets are actuated in the same manner as was described with reference to the single chute blade 24 associated with Right to Left sort magnets 224. At 11 time of the card cycle, at which time the Right to Left sort magnets are energized in response to the 8 perforation in column 3, the leading edge of this card will have been advanced just under to the right of the B blade 24 (FIG. 2A) and this card is thus fed over the A blade 24 and stacked in the A pocket 14. Each of the cards from the even pocket 12 is similarly sensed and directed into one of the pockets 12 in the Right group according to the digit it bears in column 3, and then each of the cards from the odd pocket is sensed and directed in these pockets on top of the odd cards. At the end of the operation the position of the cards is, as shown in FIG. 1A, for after the second sort. According to the novel method of sorting herein disclosed the cards bearing the digits 8, 6, 4, 2 and 0 are directed into the A, B, C, D and E pockets, respectively. Then the card bearing digits 9, 7, 5, 3 and 1 are directed on top of the even cards in the same pockets A, B, C, D and E, respectively.

The last card fed during the above described Left to Right operation is the card designated 639 which card, as shown in FIG. 1A, is the bottom card in the odd pocket 12 at the beginning of the second sorting operation. Feeding of this card from the odd pocket causes restoration of the associated contacts 146 to make available a circuit to energize relay 31R and thereby condition the circuitry for the change from Left to Right to Right to Left operation. This circuit extends in FIG. 10A from line 252 through conductor 258, contacts 2Ra and 294b now closed, and the "d" contacts of the assemblies 146 for both the odd and the even to and through relay 31R to line 254. Energization of relay 31R closes contacts 31Ra to complete a circuit from line 252 through these contacts and timing motor TM to line 254. As before explained, timing motor TM rotates cam 294 180 degrees in the time needed to allow all cards fed from the Left pocket 12 to be properly stacked in the Right pockets 14. At this time the low portion of the cam allows the cam follower to transfer the contacts to the position shown in FIG. 10A with contacts 294a closed and contacts 294b open. The opening of contacts 294b causes relay 33R and 40R to be deenergized thereby restoring their contacts to the proper condition for Right to Left operation. The opening of contacts 294b also causes Left to Right solenoid 30 to be deenergized and the closing of contacts 294a, through a circuit previously described, causes the Right to Left solenoid 28 to be energized to thereby reverse the direction of rotation of main horizontal shaft 26. The opening of contacts 294b also causes relay 31R to be deenergized and the contacts 31Ra to be restored to their normal open position. However, in the time relay 31R is held energized circuits are available to energize the column select magnet 272M, the sort control magnet 274M and the stepping switch magnet 299M. The first of these circuits extends, in FIG. 10B, from the line 252 through contacts 31Rb transferred to and through the magnets 272M and 274M in parallel to line 254. The deenergization of the relay 31R and opening of its contacts 31Rb deenergizes these magnets and this deenergization in a manner previously described causes each of the switches to be stepped one step in a clockwise direction. Since this is the second stepping operation, switch 274 is advanced to a setting of 2 representative of the 2 columns of information still to be sorted, and switch 272 is advanced to column 2 which is the column to be sorted during the next two sorting operations. With switch 272 at a setting of 2, the terminal 272T, connected to the junction 372 in the cathode circuits of the photocells 164 in both the Left and Right rows which correspond to column 2, is insulated from ring 272a thereby conditioning the circuitry to control sort magnets 224 in accordance with the data contained in column 2 of the cards being fed. The circuit to energize stepping magnet 299M, and thus advance stepping switch 299 to the 3 position, extends in FIG. 10B from line 252, through contacts 31Rc transferred and magnet 299M to line 254.

The second Right to Left operation is now accomplished in the same manner as described in connection with the first sort. Referring to FIG. 1A, cards are first fed out of the A pocket 14 and then out of the succeeding pockets under control of the contact assemblies 146. The cards are registered at the sensing station by gate 166, and are then sensed and directed into the pockets 12 of the Left group according to whether the digital information contained in column 2 is odd or even. At the end of this sort operation the cards are in the position shown for after the third sorting operation in FIG. 1A.

As the last card, which is the card designated 351, is fed from the E pocket 14 during this second Right to Left operation, the contacts in the assembly 146 associated with that pocket are restored to their normal condition. A circuit is then available as previously described to energize relay 17R, thereby closing contacts 17Ra to complete a circuit to timing motor TM. The resulting transfer of contacts 294a causes Right to Left solenoid 28 to be deenergized. The coincident transfer of contacts 294b causes the Left to Right solenoid 30 and relays 33R and 40R to be energized anticipatory of the Left to Right operation to follow. The energization and deenergization of relay 17R, as before, causes circuits to be completed to the column select magnet 272M, the sort control magnet 274M and the stepping switch magnet 299M, stepping switch 299 is thus advanced to position 4, but switches 272 and 274, since their construction is such that two stepping operations are required for an advance of 1 column index point, remain set at 2. Thus, during this fourth sorting operation, which is the second Left to Right operation, the photocell 164 in the right row 20 corresponding to column 2 is responsive to control Left to Right sort magnets 224 and cause the cards to be directed into pockets in the Right group according to the digits contained in this column. After completion of this operation, the cards are in the position shown, in FIG. 1A, for after the fourth sorting operation. After completion of this fourth sorting operation relay 31R is again energized and deenergized to condition the machine for the fifth sorting operation which is a Right to Left operation. Solenoid 30, as well as relays 33R and 40R, are deenergized and solenoid 28 is again energized and the magnets 272M, 274M and 299M are energized to advance switches 272, 274 and 299 one step. The energization of magnet 299M is effective to restore switch 299, which after the fourth sorting operation is in the 4 position, to the 1 position and the energization of magnets 272M and 274M is effective to advance switches 277 and 274 to a setting of 1. Stepping of switch 274 to the 1 position, as is shown in FIG. 10C, causes the lobe 274L to engage and raise an actuator 296a to thereby close a pair of contacts 296. With contacts 296 closed, a relay 36R is held energized by a circuit extending from line 252 through contacts 296 and the coil of this relay to line 254. Energization of this relay signifies that the sort now being accomplished is on the last column of the field, and conditions the machine to stop after the next Left to Right operation.

The fifth sorting operation, initiated by the above mentioned energization of relay 31R, is the same as the previously described Right to Left operations with the exception that with switch 272 set at 1, each of the cards is directed into one or the other of the pockets 12 according to whether the digital information contained in column 1 is odd or even. At the conclusion of this fifth operation relay 17R is again energized and the machine conditioned for a Left to Right operation. Stepping switch 299 is advanced to the two position, but switches 272 and 274 remain at a setting of 1. Solenoid 31R and relays 33R and 40R are energized and the sixth sorting operation is accomplished in the same manner as the previously dscribed Left to Right sorting operations, with the exception that, switch 272 being set at 1, each card is directed into one of the pockets 14 according to the digital information contained in column 1.

Since this sixth operation, which is a Left to Right operation, is the last operation required, the machine must be stopped after its completion so that the cards may be removed from the pocket 14. The circuitry is conditioned to stop the machine when, at the end of this Left to Right operation, relay 31R is energized to start timing motor TM. Cam 294 is then rotated so that it reaches the position shown in FIG. 10A after the last card is properly stacked in the appropriate pocket 14. With the cam in this condition contacts 294a are closed, thereby completing the previously described energizing circuit to the Right to Left solenoid 28. Since relay 36R is now being held energized, the contacts 36Rb are now closed and a parallel circuit extends in FIG. 10A from solenoid 28 through these contacts to and through relay 3R. The energization of relay 3R opens the contacts 3Ra thereby opening the hold circuit to relay 1R. Relay 1R is thus deenergized opening its contacts 1Ra to thereby break the energizing circuit to drive motor 16 and relay 2R. Drive motor 16 ceases to drive the shaft 26 and the deenergization of relay 2R opens contacts 2Ra (FIG. 10A), thereby deenergizing relay 3R so that the machine is in condition for another sorting operation. The cards 11 in the right pocket 14 may be removed, the cards taken from the D pocket being placed on top of those taken from the F pocket, those taken from the C pocket on top of those taken from the D pocket, etc. Another group of cards to be sorted may now be placed in the machine and the switches 272, 274 and 299, properly set for another sorting operation which may be initiated as before by the depression of start key 256 in FIG. 10A.

*Alphabetic sorting.*—Alphabetic information is punched in the well-known type "IBM" cards, utilized with the preferred embodiment of the machine herein described, in combinational form. Each letter of the alphabet is represented by a single perforation in a zone field, which comprises index positions 12, 11 and 0, in combination with a single perforation in a numeric field which comprises index point positions 1 through 9. The combinations are illustrated on the card shown in FIG. 8, the letter A for example being represented by a 12 and a 1 perforation in the same column, the letter B by a 12 and a 2 perforation, etc. In order to properly arrange cards according to alphabetic information contained therein, it is necessary that four sorting operations be accomplished on each column of the alphabetic sort field. During the first sorting operation, which is as before a Right to Left operation, each card is directed into either the odd or even pocket 12 of the Left group according to whether the perforation contained in the numeric field (1 through 9) of the column being sorted is odd or even. During the second sorting operation the cards are arranged in the A, B, C, D and E pockets 14 of the Right group according to the digital perforations contained in the numeric field of this same column. During the third sorting operation the cards are directed into the pockets 12 in accordance with the zone perforations, those cards having an 11 perforation in the column being sorted are directed into the odd pocket 12, and those bearing either a 12 or 0 perforation are directed into the even pocket 12. During the fourth sorting operation, the cards are directed into the E and F pockets 14 of the Right group, the cards from the even pocket being fed first and those bearing a 12 perforation being directed into the F pocket and those bearing a 0 perforation being directed into the E pocket. This fourth sorting operation and thus the sorting for the particular column is completed by then feeding the cards from the odd pocket, which cards bear an 11 perforation, into the F pocket on top of the cards having a 12 perforation. If desired, the cards may then be arranged in alphabetic order with respect to the particular column by removing the cards and placing the cards taken from the F pocket on top of those taken from the E pocket. Where the alphabetic field is multi-order the above described four sorting operations are repeated for each column of the field and the cards removed from the E and F pockets after the completion of the fourth operation for the highest order in the sort field. Alphabetic sorting, as carried out in accordance with the novel sorting method of the present invention, is illustrated in the flow diagram of FIG. 1B wherein there is depicted the position of a group of cards, each bearing a single order of alphabetic information, after each of the four sorting operations necessary to arrange them in sequence. In this figure, each card is identified by the letter which it bears and there is shown in parenthesis next to the identifying letter, the combinational perforations which represent the letter in the "IBM" code.

In setting up the machine for alphabetic sorting operation the procedure is similar to that described for numeric sorting with the exception that the switch 298 (FIG. 10B) is set in the A position. During alphabetic sorting most of the operations including card feeding, card registering and card stacking are accomplished in the same manner as above described with respect to numeric sorting and only those operations which are different will be described in detail.

Since four sorting operations are required for each column of alphabetic data, it is now necessary that the switches 272 and 274 (FIG. 10C) be advanced one digit for each four sorting operations. To advance each of these switches one digit, as has been previously explained two stepping operations are necessary. During numeric sorting each switch is stepped once upon the energization of relay 17R closing contact 17Rb (FIG. 10B) at the end of a Right to Left operation and then again upon the energization of relay 31R closing contacts 31Rb at the end of each Left to Right sorting operation, the latter stepping being effective to advance the switches to the next digit. During alphabetic sorting, relays 17R and 31R are similarly energized at the end of each Right to Left and Left to Right operation, respectively, however, with switch 298 in the A position the closing of contacts 17b at the end of a Right to Left operation does not complete an energizing circuit to switch magnets 272M and 279M. The energizing circuit completed upon closing of contacts 31Rb at the end of each Left to Right operation does not include switch 298 and thus, is available at the end of each Left to Right operation during both numeric and alphabetic sorting. Thus, magnets 272M and 274M are, during alphabetic operation, energized to advance their respective switches one step only after each Left to Right operation thereby causing the switches to be advanced one digital setting after each fourth sorting operation. The operation of the stepping switch 299 is the same as described with reference to numeric sorting, the switch being advanced one step after each Right to Left and each Left to Right operation. The circuit supplying positive potential to the plates 164b of cathodes 164 includes this switch and during alphabetic sorting, with switch 298 in the A position the circuit is different for each of the four sorting operations. During the first operation, a Right to Left operation, the circuit to the plates 164b of photo cells 164 extends in FIG. 10B from line 252 through switch 299 in the 1 position and thence as before through cam contacts C8 to the plates 164b. Cam contacts C8, as shown in FIG. 9 are closed when the odd index point position are presented to the left row 18 of sensing devices thereby causing each card, during the first sorting operation, to be directed into one or the other of the pockets 12 according to whether the digit sensed therein is odd or even. During the second sorting operation the circuit to plates 164b extends through switch 299 in the 2 position, switch 298 in the A position and cam contacts C9a which contacts are, as shown in FIG. 9, closed during the time within which the 1 through 9 index positions of a card being fed Left to Right are presented to the right row 20 of sensing devices. Thus, during the second sort each of the cards is directed into one of the pockets 14 in accordance with which of the digits 1 through 9 it contains in the column being sorted on. During the third sorting operation, the circuit to plates 164b extends through switch 299 in the 3 position, switch 298 in the A position, and cam contacts C10. These contacts are closed only at the time, during Right to Left operation, when the 11 index point positions of a card being fed are presented to the left row 18 of sensing devices, thereby causing the cards bearing a perforation in the 11 index point position to be directed to the odd pocket 12 and the other cards to be directed to the even pocket 12. During the fourth sorting operation, the circuit to the plates 164b extends through switch 299 in the 4 position, switch 298 in the A position and cam contacts C11. These contacts are closed at the time, during a Left to Right operation, when the 12, 11 and 0 index positions of a card being fed are presented to the right row 20 of sensing devices, thereby causing those cards which bear a 12 or an 11 perforation in the column being sorted to be passed over the F blade 24 and be directed into the F pocket 14, and those cards bearing a 0 perforation in the column being sorted on to pass under the F blade 24 and over the E blade 24 and be directed into the E pocket 14.

The alphabetic sorting operation is otherwise the same as that described for numeric sorting, the gates 166 and 168 registering the cards fed, and chute blades 24 directing the cards into the proper pockets according to the information sensed. When the sorting operation is complete with all of the cards in the pockets 14 of the Right group, the machine will be automatically stopped, in the manner previously described, by the circuitry under the control of the contacts 296 operated by the sort control switch 274.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intentions therefore, to be limited only as indicated by the scope of the following claims.

What is claimed is:

1. In a machine for arranging a plurality of records in an order sequential with respect to an order of a decimal digital identifying data associated with each record, a first group of record receptacles, a second group of record receptacles, there being five receptacles in said first group and two receptacles in said second group, means operable when said records are in receptacles in said first group for translating the records from the receptacles in said first group to the receptacles in said second group, said translating means being subsequently operable to translate the records first from one of the receptacles in said second group and then from the other of said receptacles in said second group to receptacles in said first group, means intermediate said first and second groups of receptacles for sensing said order of identifying data for the records translated from receptacles in either of said groups to receptacles in the other of said groups, and means responsive to said sensing means for directing each of the records translated from the receptacles in said first group to one or the other of the receptacles in said second group according to whether the digit in said order sensed is odd or even, said directing means including means responsive to said sensing means for directing each of the records translated from the receptacles in said second group to a receptacle in said first group in accordance with the digit in said order sensed.

2. In a machine for arranging a plurality of records in an order sequential with respect to an order of identifying data recorded in a particular digital notation with each record, a first group of record receptacles, the number of receptacles in said first group being equal to half the number of digits in said notation, a second group of record receptacles, there being two receptacles in said second group, means operable when said records are in receptacles in said first group to translate said records from the receptacles in said first group to the receptacles in said second group and then to translate the records from the receptacles in said second group to the receptacles in said first group, means for sensing said order of identifying data for said records being translated between said receptacles, first means responsive to said sensing means during said translating of the records from receptacles in said first group to receptacles in said second group for directing records identified in said order by alternate digits in said notation to one of said record receptacles in said second group and records identified by the other digits in said notation to the other receptacle in said second group, and second means responsive to said sensing means during said subsequent translating of records from receptacles in said second group to the receptacles in said first group for directing said records to the receptacles in said first group, said second means being effective to direct to each of said receptacles in said first group records identified in said order by a particular one of said alternate digits and records identified by a particular one of said other digits which particular digits are successive in said notation.

3. In a machine for arranging a plurality of records in an order sequential with respect to an order of decimal digital identifying data recorded in each record, a first group of record pockets, a second group of record pockets, there being five pockets in said first group and two pockets in said second group, a sensing station intermediate said first and second groups of card pockets, means operable when said records are in pockets in said first group to feed said records out of the pockets in said first group through said sensing station and into the pockets in said second group, said feed means being operable when said records have been fed into pockets in said second group to feed the records first out of one and then out of the other of the pockets in said second group into pockets in said first group, means at said sensing station for sensing said order of identifying data in said records as they are fed from pockets in either group to pockets in the other group, means responsive to said sensing means sensing said order of identifying data in records fed from pockets in said first group and effective to direct the records identified by an even digit in said order sensed to a first one of the pockets in said second group and to direct the records identified by an odd digit in said order sensed to a second one of said pockets in said second group, said directing means being responsive to said sensing means sensing said order of identifying data in records as they are fed from pockets in said second group and effective to direct to each of the pockets in said first group all of the records identified by a particular even digit and all of the records identified by a particular odd digit adjacent said particular even digit in the decimal notation.

4. In a machine for arranging a plurality of record cards in an order sequential with respect to an order of decimal digital identifying data recorded with each record, a first and a second group of card pockets, there being five pockets in said first group and two pockets in said second group, a sensing station intermediate said first and second groups of card pockets, means operable when said cards are in pockets in said first group to feed the cards out of the pockets in said first group through said sensing station and into the pockets in said second group, means at said sensing station for sensing said order of identifying data in said records fed from pockets in said first group, first means responsive to said sensing means sensing said order of identifying data in the cards fed from pockets in said first group for directing the cards identified by an even digit in said order to one of the pockets in said second group and the cards identified by an odd digit in said order to the other of the pockets in said second group, said feed means being operable when the cards have been fed from the pockets in said first group to the pockets in said second group to first feed the cards from said one pocket and then from said other pocket in said second group through said sensing station and into pockets in said first group, said sensing means being effective to sense said order of identifying data in said cards fed from the pockets in said second group, second means responsive to said sensing means sensing said order in the cards fed from pockets in said second group for directing to each of the pockets in said first group the cards identified by a particular even digit and the cards identified by a particular odd digit adjacent said particular even digit in the decimal notation.

References Cited in the file of this patent

UNITED STATES PATENTS

| | | |
|---|---|---|
| 2,053,068 | Daly | Sept. 1, 1936 |
| 2,265,441 | Maul | Dec. 9, 1941 |
| 2,531,874 | Dean et al. | Nov. 28, 1950 |
| 2,669,354 | Perrin | Feb. 16, 1954 |
| 2,708,514 | Maul | May 17, 1955 |
| 2,720,360 | Luhn | Oct. 11, 1955 |
| 2,795,328 | Tyler | June 11, 1957 |